(12) United States Patent
Clark

(10) Patent No.: US 11,751,979 B2
(45) Date of Patent: Sep. 12, 2023

(54) ORTHODONTIC APPLIANCE FOR EXPANSION OF DENTITION

(71) Applicant: William J. Clark, Leven (GB)

(72) Inventor: William J. Clark, Leven (GB)

(*) Notice: Subject to any disclaimer, the term of this patent is extended or adjusted under 35 U.S.C. 154(b) by 2 days.

(21) Appl. No.: 17/570,897

(22) Filed: Jan. 7, 2022

(65) Prior Publication Data

US 2022/0226075 A1 Jul. 21, 2022

Related U.S. Application Data

(63) Continuation of application No. 17/335,442, filed on Jun. 1, 2021, now abandoned, which is a continuation of application No. 16/547,984, filed on Aug. 22, 2019, now Pat. No. 11,020,207.

(60) Provisional application No. 62/772,702, filed on Nov. 29, 2018, provisional application No. 62/770,642, filed on Nov. 21, 2018.

(51) Int. Cl.
*A61C 7/10* (2006.01)
*A61C 7/08* (2006.01)
*A61C 7/02* (2006.01)

(52) U.S. Cl.
CPC ............... *A61C 7/10* (2013.01); *A61C 7/08* (2013.01); *A61C 7/02* (2013.01)

(58) Field of Classification Search
CPC ...................................................... A61C 7/10
See application file for complete search history.

(56) References Cited

U.S. PATENT DOCUMENTS

| 5,203,695 | A | 4/1993 | Bergersen |
| 5,376,001 | A | 12/1994 | Tepper |
| 5,607,300 | A | 5/1997 | Tepper |
| 5,871,350 | A | 2/1999 | Clark et al. |
| 6,220,856 | B1 | 4/2001 | Carano et al. |
| 6,332,774 | B1 | 12/2001 | Chikami |
| 6,491,519 | B1 | 12/2002 | Clark et al. |
| 6,568,935 | B2 | 5/2003 | Clark |
| 7,121,825 | B2 | 10/2006 | Chishti et al. |
| 9,795,461 | B2 | 10/2017 | Kopelman et al. |
| 2003/0049581 | A1* | 3/2003 | DeLuke ............... A61C 7/10 433/7 |
| 2003/0224311 | A1 | 12/2003 | Cronauer |
| 2004/0009449 | A1 | 1/2004 | Mah et al. |

(Continued)

FOREIGN PATENT DOCUMENTS

DE 10213823 A1 * 9/2003 ............... A61C 7/10
WO 2004098432 A2 11/2004

*Primary Examiner* — Heidi M Eide
(74) *Attorney, Agent, or Firm* — Snell & Wilmer L.L.P.

(57) ABSTRACT

An orthodontic appliance is disclosed that integrates an arch expander with a first segment and a second segment. The first and second segments are disposed on opposite sides of a midline of a dentition of an orthodontic patient. Both the first segment and the second segment are disposed over multiple teeth on the respective side of the midline, with a gap existing proceeding along the dentition between anterior-most portions of the first segment and the second segment. The arch expander is integrated with the first and second segments to exert an anteriorly-disposed expansion force on the patient's dentition through the first and second segments, for instance where the posterior-most location where these expansion forces are exerted corresponds with a first bicuspid on each side of a permanent the dentition.

16 Claims, 24 Drawing Sheets

(56) References Cited

U.S. PATENT DOCUMENTS

| | | |
|---|---|---|
| 2004/0009450 A1 | 1/2004 | Clark |
| 2005/0186524 A1 | 8/2005 | Abolfathi et al. |
| 2009/0098500 A1 | 4/2009 | Diaz Rendon |
| 2016/0120624 A1* | 5/2016 | Yousefian ............... A61C 7/10 433/17 |
| 2016/0270884 A1 | 9/2016 | Yousefian |

* cited by examiner

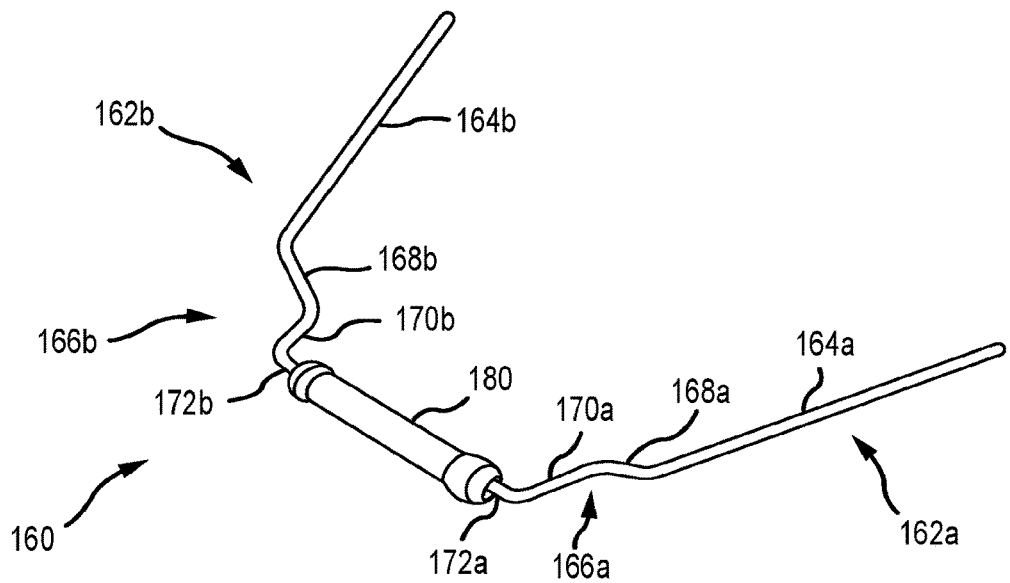
FIG.7C
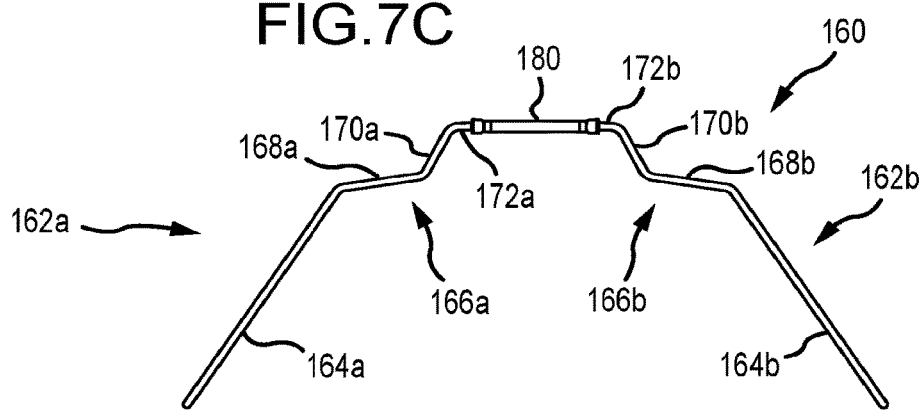
FIG.7D
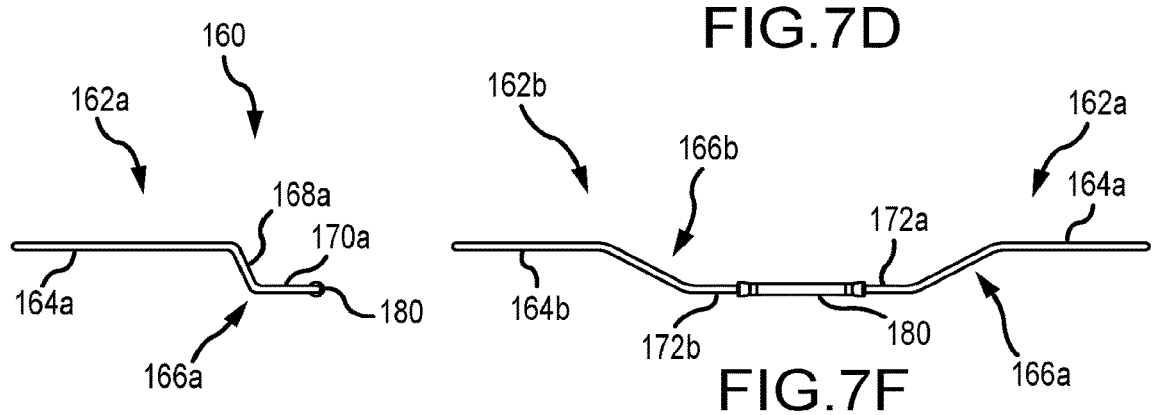
FIG.7E
FIG.7F

ORTHODONTIC APPLIANCE FOR EXPANSION OF DENTITION

CROSS-REFERENCE TO RELATED APPLICATIONS

This patent application is continuation of co-pending U.S. patent application Ser. No. 17/335,442, having a filing/§ 371(c) date of 2021 Jun. 1, which is a continuation of U.S. patent application Ser. No. 16/547,984, having a filing/§ 371(c) date of Aug. 22, 2019 (now U.S. patent Ser. No. 11/020,207), which is a non-provisional patent application of, and claims the benefit of, each of U.S. Provisional Patent Application No. 62/770,642, filed on Nov. 21, 2018, and U.S. Provisional Patent Application No. 62/772,702, filed on Nov. 29, 2018. The entire disclosure of each patent application set forth in this Cross-Reference to Related Applications is hereby incorporated by reference.

FIELD

The present invention generally relates to the field of orthodontics and, more particularly, to the expansion of a dentition or dental arch of a patient.

BACKGROUND

There are various types of appliances in the prior art for applying treatment forces on the lingual of a patient's dental arch to develop or change the shape of this dental arch in at least some manner (generally, "lingual arches"). One way in which the patient's dental arch may be at least generally reshaped is by increasing the length of the dental arch, or its mesio-distal extent. Another way in which the dental arch may be at least generally reshaped is by increasing its width or its lateral extent. Oftentimes the reshaping that is desired by the orthodontist is some combination of both dental arch length and width.

Many different ways of generating the desired treatment forces by lingual arches have been proposed/implemented. Expansion of the patient's dental arch may be accomplished by a resilient, generally U-shaped lingual wire whose two "legs" must be compressed toward each other in order to install the same within the patient's mouth on the lingual. The resiliency of the two legs of the lingual wire exerts a biasing force on the lingual of posterior teeth of the patient's dental arch in a direction that is at least generally transverse to the midline of the patient's dental arch. Another expansion approach is to anchor a wire on opposite sides of the patient's upper dental arch, and to form/include one or more force generating loops in the wire to generate at least generally transversely directed forces (i.e., transverse to the midline of the dental arch). Still another approach is palatal expansion by what is commonly referred to as a palatal expansion screw.

SUMMARY

A first aspect of the present invention is embodied by an orthodontic appliance, and which may be described in relation to a reference axis and a reference plane. The reference axis is shaped to replicate a dentition of an orthodontic patient on which the orthodontic appliance is intended to be installed (e.g., the reference axis may be at least generally U-shaped). The reference plane at least generally bisects the reference axis through a closed end of the reference axis, and may coincide with a midline of the dentition on which the orthodontic appliance is configured for installation. First and second segments of the orthodontic appliance are disposed on opposite sides of the reference plane, with there being an anterior gap (i.e., an open space) between the first segment and the second segment proceeding along the reference axis. Each of the first and second segments includes a buccal wall (e.g., the buccal or cheek side of the dentition), a lingual wall (e.g., the lingual or tongue side of the dentition) that is spaced from its corresponding buccal wall, and an occlusal wall (e.g., corresponding with the "chewing" surfaces of the dentition or the surface that faces or projects toward the opposing dentition with the upper and lower jaws being in a closed position) that extends between its corresponding buccal and lingual walls. The buccal wall, occlusal wall, and lingual wall of the first segment collectively define a first cavity, while the buccal wall, occlusal wall, and lingual wall of the second segment collectively define a second cavity. An expander of the orthodontic appliance includes a first leg, a second leg, and an expansion module. The first leg engages and is fixed relative to the first segment and includes a first section (e.g., a first end section) that movably interfaces with the expansion module. The second leg engages and is fixed relative to the second segment and includes a second section (e.g., a second end section) that interfaces with the expansion module. The first section of the first leg and the expansion module are collectively oriented such that the expansion module biases each of the first leg and the second leg of the expander away from the reference plane when the orthodontic appliance is disposed in an installed configuration (e.g., an expansion force is exerted on the dentition when the orthodontic appliance is in an installed configuration).

A number of feature refinements and additional features are applicable to the first aspect of the present invention. These feature refinements and additional features may be used individually or in any combination. The following discussion is applicable to the first aspect, up to the start of the discussion of a second aspect of the present invention. The orthodontic appliance may be adapted for installation on an upper dentition or a lower dentition of an orthodontic patient, may be adapted for installation on a permanent dentition or a mixed dentition (i.e., a dentition that includes both permanent teeth and deciduous/baby/temporary teeth), or any combination thereof.

There is an anterior gap between the anterior end of the first segment (the anterior-most or mesial-most portion of the first segment; the most forwardly disposed portion of the first segment when installed on the dentition) and the anterior end of the second segment (the anterior-most or mesial-most portion of the second segment; the most forwardly disposed portion of the second segment when installed on the dentition). This anterior gap may correspond with at least the central incisors (or centrals) and the lateral incisors (or laterals) of the dentition when the orthodontic appliance is in an installed configuration. As such and in this instance, at least a central incisor and a lateral incisor on one side of the dentition are not received in the first cavity of the first segment, and similarly at least a central incisor and a lateral incisor on the opposite side of the dentition are not received in the second cavity of the second segment. One embodiment has at least a central incisor and a lateral incisor on one side of the dentition and at least a central incisor and a lateral incisor on the opposite side of the dentition remaining exposed when the orthodontic appliance is installed on the dentition (i.e., these teeth are not captured in any tooth-receiving cavity of the orthodontic appliance).

The first segment and the second segment may provide the entirety of the anchoring function for the orthodontic appliance in relation to the orthodontic appliance being in an installed configuration on the patient's dentition. Stated another way, the orthodontic appliance may be characterized as including a dentition anchor, and this dentition anchor may be limited to the first segment and the second segment (e.g., the orthodontic appliance is not anchored to any teeth of the patient's dentition that are anterior of the first and second segments, such as at least central incisors and lateral incisors). The first segment may be characterized as being disposed on one portion of the patient's dentition, while the second segment may be characterized as being disposed on a completely different, non-overlapping portion of the patient's dentition, all when the orthodontic appliance is disposed in an installed configuration. One embodiment has the first segment being disposed on a first side of the midline of the dentition when the orthodontic appliance is in an installed configuration, and with the second segment being disposed on the opposite, second side of the midline of this dentition when the orthodontic appliance is in an installed configuration, including with there being at least 4 teeth of the patient's dentition proceeding along the dentition from the anterior-most portion of the first segment to the anterior-most portion of the second segment (e.g., a central incisor and a lateral incisor on each side of the midline).

The first and second cavities of the first and second segments, respectively, each may be configured to accommodate receipt of multiple teeth, including at least three adjacently-disposed teeth (or at least the location of three adjacently-disposed teeth in the dentition). The first cavity of the first segment may be configured to accommodate receipt of a first bicuspid, a second bicuspid, and a first molar on a first side of a permanent dentition (relative to the corresponding midline), but not to accommodate receipt of a central incisor, a lateral incisor, and a cuspid on this same first side of such a permanent dentition. The second cavity of the second segment may be configured to accommodate receipt of a first bicuspid, a second bicuspid, and a first molar on a second side of a permanent dentition (relative to the corresponding midline), but not to accommodate receipt of a central incisor, a lateral incisor, and a cuspid on this same second side of such a permanent dentition. The first segment, the second segment, or both could be configured to accommodate receipt of additional posterior teeth, such as a corresponding first molar.

The first cavity of the first segment may be configured to accommodate receipt of a deciduous canine, a first deciduous molar, a second deciduous molar, and a first permanent molar on a first side of a mixed dentition (relative to the corresponding midline), but not to accommodate receipt of a central incisor and a lateral incisor on this same first side of such a mixed dentition. The second cavity of the second segment may be configured to accommodate receipt of a deciduous canine, a first deciduous molar, a second deciduous molar, and a first permanent molar on a second side of a mixed dentition (relative to the corresponding midline), but not to accommodate receipt of a central incisor and a lateral incisor on this same second side of such a mixed dentition. The first segment, the second segment, or both could be configured to accommodate receipt of additional posterior teeth, such as a second permanent molar.

The first and second segments may be in the form of integral or autonomous structures, may be separately formed structures, or any combination thereof. Representative characterizations of the first and second segments are that they may each be in the form of an overlay, cover, cap, or the like (e.g., an inner or tooth-facing surface of the occlusal wall, buccal wall, and lingual wall of the first segment each at least generally approximating a corresponding surface of teeth when positioned in the first cavity; an inner or tooth-facing surface of the occlusal wall, buccal wall, and lingual wall of the second segment each at least generally approximating a corresponding surface of teeth when positioned in the second cavity). One could view the first and second segments as being separate and distinct portions of an aligner, retainer, or the like. However, preferably the first and second segments are themselves passive structures—the first and second segments are not configured to themselves generate an orthodontic treatment force on the corresponding portion of the dentition in one embodiment (e.g., a shape of the first cavity of the first segment does not itself exert an orthodontic treatment force on teeth when positioned in the first cavity; a shape of the second cavity of the second segment does not itself exert an orthodontic treatment force on teeth when positioned in the second cavity). However, the first and second segments do transmit the expansion forces provided by the expander to the corresponding portions of the dentition (e.g., at least the portion of the dentition engaged by the first segment, and at least the portion of the dentition engaged by the second segment). As such, the first and second segments are preferably formed from a material and/or of a configuration such they have sufficient rigidity to transmit the expansion forces to the different portions of the dentition engaged by the first and second segments, respectively.

The first and second legs of the expander may include first and second occlusal sections, respectively, where the occlusal wall of the first segment includes the first occlusal section and where the occlusal wall of the second segment includes the second occlusal section (e.g., the first and second occlusal sections of the expander may be embedded within the occlusal wall of the first and second segments, respectively; the first and second occlusal sections of the expander may be anchored to internal, occlusally-disposed surfaces of the first and second segments, respectively). The first and second legs of the expander may include first and second lingual sections, respectively, where the lingual wall of the first segment includes the first lingual section and where the lingual wall of the second segment includes the second lingual section (e.g., the first and second lingual sections of the expander may be embedded within the lingual wall of the first and second segments, respectively; the first and second lingual sections of the expander may be anchored to internal, lingually-disposed surfaces of the first and second segments, respectively; the first and second lingual sections of the expander may be anchored to external, lingually-disposed surfaces of the first and second segments, respectively).

Each of the first and second legs of the expander may be one of around wire, a square wire, or a rectangular wire. Relative motion between the expansion module and the first end section of the first leg of the expander may be limited to relative axial motion (e.g., by utilizing a square or rectangular wire configuration). The first end section of the first leg of the expander may be both rotatable and axially movable relative to the expansion module (e.g., by utilizing a round-wire configuration).

The expansion module generates the expansion forces that are exerted on the first and second segments, respectively, which will expand at least the portions the dentition on which the first and second segments are installed. One embodiment has the expansion module including a housing, a head, and a spring. The head may be disposed within and movable along an axis relative to the housing. The spring may be disposed between the head and an opposing portion of the housing. A first end section of the first leg of the expander may extend through the housing, may be fixed to the head, and may be movable relative to the housing, while a second end section of the second leg of the expander may be fixed to the housing. A spacing between the head and the second end section of the second leg of the expander (or the opposite end of the expander housing) may be changed by each of a compression and an expansion of the spring. The spring may be incorporated so as to bias the head, and thereby the first end section of the first leg of the expander, away from the second end section of the second leg of the expander (or the opposite end of the expander housing).

One embodiment has only a single expansion force being exerted on the first leg and that is generated by the expansion module, and only a single expansion force being exerted on the second leg and that is generated by the expansion module. In this case the expansion module may be characterized as exerting a first expansion force on the first leg and a second expansion force on the second leg, where these first and second expansion forces may be collinear with one another and may be directed in opposite directions. These first and second expansion forces may be represented by first and second vectors, respectively, for purposes of the following discussion.

When the orthodontic appliance is installed on the dentition, the above-noted first vector may intersect the dentition at a location that is spaced (e.g., anteriorly or mesially) from the first segment along the dentition by no more than one tooth spacing, while the above-noted second vector may intersect the dentition at a location that is spaced (e.g., anteriorly or mesially) from the second segment along the dentition by no more than one tooth spacing. Consider the case where the anterior-most portion of the first segment is associated with the first bicuspid on a first side of the dentition and where the anterior-most portion of the second segment is associated with the first bicuspid on the opposite second side of the dentition. In this case, the first vector may intersect the first side dentition within a range extending from the location of the corresponding cuspid (which is anterior of the first bicuspid) to the location of the corresponding first bicuspid (the anterior-most portion of the first segment in this example), while the second vector may intersect the second side of the dentition within a range extending from the location of the corresponding cuspid (which is anterior of the first bicuspid) to the location of the corresponding first bicuspid (the anterior-most portion of the second segment in this example).

When the orthodontic appliance is installed on the dentition, a posterior-most (or distal-most) location where the above-noted first vector intersects the first side of the dentition coincides with the location of a corresponding first bicuspid for the case of a permanent dentition or the location of the corresponding first deciduous molar for the case of a mixed dentition, while a posterior-most (or distal-most) location where the above-noted second vector intersects the second side of the dentition coincides with the location of a corresponding first bicuspid for the case of a permanent dentition or the location of the corresponding first deciduous molar for the case of a mixed dentition. That is, the orthodontic appliance of the first aspect may be characterized as providing for expansion of a dentition on which the appliance is installed using a more anteriorly-disposed expansion force.

When the orthodontic appliance is installed on a permanent dentition, the above-noted first vector may intersect the first side of the dentition within a region that extends from a location that coincides with the location of the corresponding first bicuspid to the location of the corresponding cuspid, while the above-noted second vector may intersect the second side of the dentition within a region that extends from a location that coincides with the location of the corresponding first bicuspid to the location of the corresponding cuspid. When the orthodontic appliance is installed on a mixed dentition, the above-noted first vector may intersect the first side of the dentition within a region that extends from a location that coincides with the location of the corresponding first deciduous molar to the location of the corresponding deciduous canine, while the above-noted second vector may intersect the second side of the dentition within a region that extends from a location that coincides with the location of the corresponding first deciduous molar to the location of the corresponding deciduous canine.

When the orthodontic appliance is installed on a permanent dentition, the above-noted first vector may intersect the first side of the dentition at a location that coincides with the location of the corresponding cuspid, while the above-noted second vector may intersect the second side of the dentition at a location that coincides with the location of the corresponding cuspid. When the orthodontic appliance is installed on a mixed dentition, the above-noted first vector may intersect the first side of the dentition at a location that coincides with the location of the corresponding deciduous canine, while the above-noted second vector may intersect the second side of the dentition at a location that coincides with the location of the corresponding deciduous canine.

The entirety of the orthodontic appliance may be defined by the first segment, the second segment, and the expander. However, the orthodontic appliance may further include a first anterior extension that extends anteriorly of the expander and a second anterior extension that extends anteriorly of the expander. The first and second anterior extensions each may be in the form of a cantilever. The first anterior extension may be part of or extend from the first leg, and the second anterior extension may be part of or extend from the second leg. One embodiment has the first and second anterior extensions being configured to engage the lingual of anterior/labial teeth (e.g., central incisors, lateral incisors) to bias/move/advance these teeth in the mesial or anterior direction (e.g., the first and second anterior extensions being curved and engaging a central incisor and lateral incisor first and second sides, respectively, of the dentition midline). Another embodiment has the first and second anterior extensions being configured to extend both anteriorly of the expander and labially (e.g., on the lip side) of anterior teeth (e.g., central incisors, lateral incisors). End sections of the first and second anterior extensions may function as labial hooks in this configuration, for instance to accommodate the anchoring of an elastic that would be disposed on the labial of the dentition.

A second aspect of the present invention is a method of orthodontic treatment. A first leg of an expander is anchored relative to a first segment that simultaneously engages a first tooth, a second tooth, and a third tooth on a first side of a midline of a dentition, with the first tooth on the first side of the midline being anterior of each of the second tooth and the third tooth on this same first side of the midline. Similarly, a second leg of an expander is anchored relative to a second segment that simultaneously engages a first tooth, a second tooth, and a third tooth on an opposite, second side of the dentition midline, with the first tooth on the second side of the midline being anterior of each of the second tooth and the third tooth on this same second side of the midline. There is a gap (e.g., an open space) between the first segment and the second segment proceeding along the dentition from the first segment to the second segment. An expansion module is disposed lingually of the dentition (i.e., on the tongue side of the dentition). A single expansion force is exerted on the first leg by the expansion module exerting a first axial force on the first leg, with a vector of this first axial force intersecting the first side of the dentition at a location that coincides with the first tooth on the first side of the dentition or anteriorly of this location. A single expansion force is exerted on the second leg by the expansion module exerting a second axial force on the second leg, with a vector of this second axial force intersecting the second side of the dentition at a location that coincides with the first tooth on the second side of the dentition or anteriorly of this location. The dentition is expanded by the first and second axial forces.

The orthodontic appliance in accordance with the first aspect may be used by the above-noted second aspect.

Any feature of any other various aspects of the present invention that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least generally" or the like in relation to a particular feature encompasses the corresponding characteristic and insubstantial variations thereof. Finally, a reference of a feature in conjunction with the phrase "in one embodiment" does not limit the use of the feature to a single embodiment.

Various aspects of the present invention are also addressed by the following paragraphs and in the noted combinations:

1. An orthodontic appliance comprising:
   a reference axis that replicates a dentition of an orthodontic patient;
   a reference plane that at least generally bisects said reference axis through a closed end of said reference axis;
   a first segment disposed on one side of said reference plane;
   a second segment disposed on an opposite side of said reference plane;
   an anterior gap between said first segment and said second segment proceeding along said reference axis, wherein each of said first segment and said second segment comprises a buccal wall, a lingual wall spaced from its corresponding said buccal wall, and an occlusal wall extending between its corresponding said buccal and lingual walls, wherein said buccal wall, said occlusal wall, and said lingual wall of said first segment collectively define a first cavity, and wherein said buccal wall, said occlusal wall, and said lingual wall of said second segment collectively define a second cavity;
   an expander comprising a first leg, a second leg, and an expansion module, wherein said first leg engages and is fixed relative to said first segment and comprises a first end section that movably interfaces with said expansion module, wherein said second leg engages and is fixed relative to said second segment and comprises a second end section that interfaces with said expansion module, and wherein said first end section of said first leg and said expansion module are collectively oriented such that said expansion module biases each of said first leg and said second leg away from said reference plane.

2. The orthodontic appliance of paragraph 1, wherein said anterior gap corresponds with at least central incisors and lateral incisors of the dentition when said orthodontic appliance is in an installed configuration such that at least a central incisor and lateral incisor on one side of the dentition are not received in said first cavity of said first segment and such that at least a central incisor and lateral incisor on the opposite side of the dentition are not received in said second cavity of said second segment.

3. The orthodontic appliance of any of paragraphs 1-2, wherein said orthodontic appliance is installable on the dentition such that said reference plane coincides with a midline of the dentition, and wherein said first segment and said second segment interface with different portions of the dentition when said orthodontic appliance is in the installed configuration.

4. The orthodontic appliance of paragraph 3, wherein said first segment is disposed on a first side of the dentition and said second segment is disposed on a second side of the dentition that is opposite of the first side when said orthodontic appliance is in the installed configuration.

5. The orthodontic appliance of any of paragraphs 2-4, wherein said first cavity of said first segment accommodates receipt of a first bicuspid, a second bicuspid, and a first molar, but does not receive a central incisor, a lateral incisor, and a cuspid, on one side of a midline for a permanent dentition when said orthodontic appliance is in the installed configuration, and wherein said second cavity of said second segment accommodates receipt of a first bicuspid, a second bicuspid, and a first molar, but does not receive a central incisor, a lateral incisor, and a cuspid, on an opposite side of the midline for the permanent dentition when said orthodontic appliance is in the installed configuration.

6. The orthodontic appliance of any of paragraphs 2-4, wherein said first cavity of said first segment accommodates receipt of a first bicuspid, a second bicuspid, a first molar, and a second molar, but does not receive a central incisor, a lateral incisor, and a cuspid, on one side of a midline for a permanent dentition when said orthodontic appliance is in the installed configuration, and wherein said second cavity of said second segment accommodates receipt of a first bicuspid, a second bicuspid, a first molar, and a second molar, but does not receive a central incisor, a lateral incisor, and a cuspid, on an opposite side of the midline of the permanent dentition when said orthodontic appliance is in the installed configuration.

7. The orthodontic appliance of any of paragraphs 2-4, wherein said first cavity of said first segment accommodates receipt of a deciduous canine, a first deciduous molar, a second deciduous molar, and a first permanent molar, but does not receive a central incisor and a lateral incisor, on one side of a midline for a mixed dentition when said orthodontic appliance is in the installed configuration, and wherein said second cavity of said second segment accommodates receipt of a deciduous canine, a first deciduous molar, a second deciduous molar, and a first permanent molar, but does not receive a central incisor and a lateral incisor, on an opposite side of the midline for the mixed dentition when said orthodontic appliance is in the installed configuration.

8. The orthodontic appliance of any of paragraphs 1-7, wherein the dentition is selected from the group consisting of an upper dentition and a lower dentition.
9. The orthodontic appliance of any of paragraphs 1-8, wherein each of said first segment and said second segment are integral structures.
10. The orthodontic appliance of any of paragraphs 1-9, wherein said first and second cavities of said first and second segments, respectively, each accommodate receipt of multiple teeth.
11. The orthodontic appliance of any of paragraphs 1-9, wherein each of said first and second cavities of said first and second segments, respectively, each accommodate at least three adjacently-disposed teeth.
12. The orthodontic appliance of any of paragraphs 1-11, wherein a shape of said first cavity of said first segment does not itself exert an orthodontic treatment force on teeth when positioned in said first cavity, and wherein a shape of said second cavity of said second segment does not itself exert an orthodontic treatment force on teeth when positioned in said second cavity.
13. The orthodontic appliance of any of paragraphs 1-12, wherein an inner surface of said occlusal wall, said buccal wall, and said lingual wall for said first segment each at least approximates a corresponding surface of teeth when positioned in said first cavity, and wherein an inner surface of said occlusal wall, said buccal wall, and said lingual wall for said second segment each at least approximates a corresponding surface of teeth when positioned in said second cavity.
14. The orthodontic appliance of any of paragraphs 1-13, wherein each of said first segment and said second segment is in the form of a passive structure.
15. The orthodontic appliance of any of paragraphs 1-14, wherein said first segment and said second segment are separately formed structures.
16. The orthodontic appliance of any of paragraphs 1-15, wherein said first and second segments are each at least substantially rigid structures.
17. The orthodontic appliance of any of paragraphs 1-16, said expander provides the only structural interconnection between said first segment and said second segment prior to installation of said orthodontic appliance.
18. The orthodontic appliance of any of paragraphs 1-17, wherein said first leg of said expander comprises a first occlusal section and said second leg of said expander comprises a second occlusal section, wherein said occlusal wall of said first segment comprises said first occlusal section, and wherein said occlusal wall of said second segment comprises said second occlusal section.
19. The orthodontic appliance of paragraph 18, wherein said first occlusal section of said expander is embedded within said occlusal wall of said first segment, and wherein said second occlusal section of said expander is embedded within said occlusal wall of said second segment.
20. The orthodontic appliance of paragraph 18, wherein said first occlusal section of said expander is anchored to an internal, occlusally-disposed surface of said first segment, and wherein said second occlusal section of said expander is anchored to an internal, occlusally-disposed surface of said second segment.
21. The orthodontic appliance of any of paragraphs 1-17, wherein said first leg of said expander comprises a first lingual section and said second leg of said expander comprises a second lingual section, wherein said lingual wall of said first segment comprises said first lingual section, and wherein said lingual wall of said second segment comprises said second lingual section.
22. The orthodontic appliance of paragraph 21, wherein said first lingual section of said expander is embedded within said lingual wall of said first segment, and wherein said second lingual section of said expander is embedded within said lingual wall of said second segment.
23. The orthodontic appliance of paragraph 21, wherein said first lingual section of said expander is anchored to an internal, lingually-disposed surface of said first segment, and wherein said second lingual section of said expander is anchored to an internal, lingually-disposed surface of said second segment.
24. The orthodontic appliance of paragraph 21, wherein said first lingual section of said expander is anchored to an external, lingually-disposed surface of said first segment, and wherein said second lingual section of said expander is anchored to an external, lingually-disposed surface of said second segment.
25. The orthodontic appliance of any of paragraphs 1-24, wherein said expansion module comprises a housing, a head disposed within and movable along an axis relative to said housing, and a spring between said head and an opposing portion of said housing, wherein said first end section of said first leg for said expander extends through said housing, is fixed to said head, and is movable relative to said housing, and wherein said second end section of said second leg for said expander is fixed to said housing.
26. The orthodontic appliance of paragraph 25, wherein a spacing between said head and said second end section of said second leg for said expander is changed by each of a compression and an expansion of said spring.
27. The orthodontic appliance of any of paragraphs 25-26, wherein said spring biases said head, and thereby said first end section of said first leg for said expander, away from said second end section of said second leg for said expander.
28. The orthodontic appliance of any of paragraphs 1-27, wherein each of said first leg and said second leg is one of a round wire, a square wire, or a rectangular wire.
29. The orthodontic appliance of any of paragraphs 1-28, relative motion between said expansion module and said first end section of said first leg for said expander is limited to relative axial motion.
30. The orthodontic appliance of any of paragraphs 1-28, said first end section of said first leg for said expander is both rotatable and axially movable relative to said expansion module.
31. The orthodontic appliance of any of paragraphs 1-30, wherein only a single expansion force is exerted on said first leg and that is generated by said expansion module, wherein only a single expansion force is exerted on said second leg and is also generated by said expansion module, wherein said expansion module exerts a first expansion force on said first leg, wherein said expansion module exerts a second expansion force on said second leg, and wherein said first and second expansion forces are collinear with one another and are directed in opposite directions.
32. The orthodontic appliance of paragraph 31, wherein said first and second expansion forces are represented by first and second vectors, respectively, and wherein when said orthodontic appliance is installed on the dentition: 1) said first vector intersects the dentition at a location that is spaced from said first segment along the dentition by no more than one tooth spacing; and 2) said second vector intersects the dentition at a location that is spaced from said second segment along the dentition by no more than one tooth spacing.

33. The orthodontic appliance of paragraph 31, wherein said first and second expansion forces are represented by first and second vectors, respectively, and wherein when said orthodontic appliance is installed on the dentition: 1) a posterior-most location where said first vector intersects one side of the dentition coincides with a location of a corresponding first bicuspid for a permanent dentition or coincides with a location of a corresponding first deciduous molar for a mixed dentition; and 2) a posterior-most location where said second vector intersects the opposite side of the dentition coincides with a location of a corresponding first bicuspid for a permanent dentition or coincides with a location of a corresponding first deciduous molar for a mixed dentition.

34. The orthodontic appliance of paragraph 31, wherein said first and second expansion forces are represented by first and second vectors, respectively, and wherein when said orthodontic appliance is installed on the dentition: 1) said first vector intersects one side of the dentition within a region extending from a location that coincides with a corresponding first bicuspid to a location that coincides with a corresponding cuspid for a permanent dentition or from a location that coincides with a corresponding first deciduous molar to a location that coincides with a corresponding deciduous canine for a mixed dentition; and 2) said second vector intersects the opposite side of the dentition within a region extending from a location that coincides with a corresponding first bicuspid to a location that coincides with a corresponding cuspid for a permanent dentition or from a location that coincides with a corresponding first deciduous molar to a location that coincides with a corresponding deciduous canine for a mixed dentition.

35. The orthodontic appliance of paragraph 31, wherein said first and second expansion forces are represented by first and second vectors, respectively, and wherein when said orthodontic appliance is installed on the dentition: 1) said first vector intersects one side of the dentition at a location that coincides with a corresponding cuspid for a permanent dentition or that coincides with a location of a corresponding deciduous canine for a mixed dentition; and 2) said second vector intersects the opposite side of the dentition at a location that coincides with a corresponding cuspid for a permanent dentition or that coincides with a location of a corresponding deciduous canine for a mixed dentition.

36. A method of orthodontic treatment, comprising:
anchoring a first leg of an expander relative to a first segment that simultaneously engages a first tooth, a second tooth, and a third tooth on a first side of a midline of a dentition, wherein said first tooth on said first side of said midline is anterior of each of said second tooth and said third tooth on said first side of said midline;
anchoring a second leg of said expander relative to a second segment that simultaneously engages a first tooth, a second tooth, and a third tooth on an opposite, second side of said midline of said dentition, wherein said first tooth on said second side of said midline is anterior of each of said second tooth and said third tooth on said second side of said midline, and wherein there is a gap between said first segment and said second segment proceeding along said dentition from said first segment to said second segment;
disposing an expansion module of said expander lingually of said dentition;
exerting a single expansion force on said first leg by said expansion module exerting a first axial force on said first leg, wherein a vector of said first axial force intersects said dentition at a location that coincides with said first tooth on said first side of said dentition or anteriorly of said first tooth on said first side of said dentition;
exerting a single expansion force on said second leg by said expansion module exerting a second axial force on said second leg, wherein a vector of said second axial force intersects said dentition at a location that coincides with said first tooth on said second side of said dentition or anteriorly of said first tooth on said second side of said dentition; and
expanding said dentition using said first axial force and said second axial force.

37. The method of paragraph 36, wherein each of said first segment and said second segment comprises a buccal wall, a lingual wall spaced from its corresponding said buccal wall, and an occlusal wall extending between its corresponding said buccal and lingual walls.

38. The method of paragraph 37:
wherein said occlusal wall of said first segment is disposed over an occlusal surface of each of said first tooth, said second tooth, and said third tooth on said first side of said midline of said dentition, wherein said buccal wall of said first segment is disposed alongside a buccal surface of each of said first tooth, said second tooth, and said third tooth on said first side of said midline of said dentition, and wherein said lingual wall of said first segment is disposed alongside a lingual surface of each of said first tooth, said second tooth, and said third tooth on said first side of said midline of said dentition; and
wherein said occlusal wall of said second segment is disposed over an occlusal surface of each of said first tooth, said second tooth, and said third tooth on said second side of said midline of said dentition, wherein said buccal wall of said second segment is disposed alongside a buccal surface of each of said first tooth, said second tooth, and said third tooth on said second side of said midline of said dentition, and wherein said lingual wall of said second segment is disposed alongside a lingual surface of each of said first tooth, said second tooth, and said third tooth on said second side of said midline of said dentition.

39. The method of any of paragraphs 36-38, wherein said first and second axial forces are collinear with one another and are directed in opposite directions.

40. The method of any of paragraphs 36-39, wherein a posterior-most location where said first axial force intersects said dentition on said first side of said midline coincides with a location of a corresponding first bicuspid for a permanent dentition or coincides with a location of a corresponding first deciduous molar for a mixed dentition, and wherein a posterior-most location where said second axial force intersects said dentition on said second side of said midline coincides with a location of a corresponding first bicuspid for a permanent dentition or coincides with a location of a corresponding first deciduous molar for a mixed dentition.

41. The method of any of paragraphs 36-39, wherein said first axial force intersects said dentition on said first side of said midline within a region extending from a location that coincides with a corresponding first bicuspid to a location that coincides with a corresponding cuspid for a permanent dentition or from a location that coincides with a corresponding first deciduous molar to a location that coincides with a corresponding deciduous canine for a mixed dentition, and wherein said second axial force intersects said dentition on said second side of said midline within a region extending from a location that coincides with a corresponding first bicuspid to a location that coincides with a corresponding cuspid for a permanent dentition or from a location that coincides with a corresponding first deciduous molar to a location that coincides with a corresponding deciduous canine for a mixed dentition.

42. The method of any of paragraphs 36-39, wherein said first axial force intersects said dentition on said first side of said midline at a location that coincides with a location of a corresponding cuspid for a permanent dentition or that coincides with a location of a corresponding deciduous canine for a mixed dentition, wherein said second axial force intersects said dentition on said second side of said midline at a location that coincides with a location of a corresponding cuspid for a permanent dentition or that coincides with a location of a corresponding deciduous canine for a mixed dentition.

43. The method of any of paragraphs 36-42, wherein said dentition is a permanent dentition, wherein an anterior-most tooth that is engaged by said first segment is a first bicuspid on said first side of said midline, wherein an anterior-most tooth that is engaged by said second segment is a first bicuspid on said second side of said midline.

44. The method of any of paragraphs 36-42, wherein said dentition is a permanent dentition, and wherein said first, second, and third teeth are a first bicuspid, a second bicuspid, and a first molar, respectively, on each of said first and second sides of said midline of said dentition.

45. The method of any of paragraphs 43-44, wherein said anchoring a first leg step further comprises said first segment simultaneously engaging said first tooth, said second tooth, said third tooth, and a fourth tooth on said first side of a midline of a dentition, and wherein said anchoring a second leg step further comprises said second segment simultaneously engaging said first tooth, said second tooth, said third tooth, and a fourth tooth on said second side of a midline of a dentition.

46. The method of paragraph 45, wherein said fourth tooth is a second molar on said first side of said midline of said dentition and a second molar on said second side of said midline of said dentition.

47. The method of any of paragraphs 43-46, wherein said first segment fails to engage a central incisor, a lateral incisor, and a cuspid on said first side of said midline of said dentition, and wherein said second segment fails to engage a central incisor, a lateral incisor, and a cuspid on said second side of said midline of said dentition.

48. The method of any of paragraphs 36-42, wherein said dentition is a mixed dentition, wherein an anterior-most tooth that is engaged by said first segment is a deciduous canine on said first side of said midline, wherein an anterior-most tooth that is engaged by said second segment is a deciduous canine on said second side of said midline.

49. The method of any of paragraphs 36-42, wherein said dentition is a mixed dentition, wherein said first, second, and third teeth are a deciduous canine, a first deciduous molar, and a second deciduous molar on each of said first and second sides of said midline of said dentition.

50. The method of paragraph 49, wherein said anchoring a first leg step further comprises said first segment simultaneously engaging said first tooth, said second tooth, said third tooth, and a fourth tooth on said first side of a midline of a dentition, and wherein said anchoring a second leg step further comprises said second segment simultaneously engaging said first tooth, said second tooth, said third tooth, and a fourth tooth on said second side of a midline of a dentition.

51. The method of paragraph 50, wherein said fourth tooth is a first permanent molar on said first side of said midline of said dentition and a first permanent molar on said second side of said midline of said dentition.

52. The method of any of paragraphs 49-51, wherein said first segment fails to engage a central incisor and a lateral incisor on said first side of said midline of said dentition, and wherein said second segment fails to engage a central incisor and a lateral incisor on said second side of said midline of said dentition.

53. The method of any of paragraphs 36-52, wherein a plurality of teeth are exposed proceeding from said first segment to said midline of said dentition proceeding along said dentition on said first side of said dentition, and wherein a plurality of teeth are exposed proceeding from said second segment to said midline of said dentition proceeding along said dentition on said second side of said dentition.

54. The method of any of paragraphs 36-53, wherein each of said first and second segments is selected from the group consisting of being removable or fixed.

55. The method of any of paragraphs 36-53, wherein each of said first and segments is bonded to said dentition.

56. The method of any of paragraphs 36-53, wherein each of said first and segments is separately fixed to said dentition.

57. The method of any of paragraphs 36-53, wherein a fit between said first segment and said dentition solely provides for a retention of said first segment on said dentition, and wherein a fit between said second segment and said dentition solely provides for a retention of said second segment on said dentition.

58. The method of any of paragraphs 36-53, further comprising securing said first segment to said dentition without an adhesive between said first segment and said dentition, and securing said second segment to said dentition without an adhesive between said second segment and said dentition.

59. The method of any of paragraphs 36-58, wherein said first leg of said expander comprises a first end section, said method further comprising the step of:

limiting relative motion between said expansion module and said first end section of said first leg to relative axial motion.

60. The method of any of paragraphs 36-58, wherein said first leg of said expander comprises a first end section, said method further comprising the step of:

allowing said first end section of said first leg to both rotate relative to said expansion module and move axially relative to said expansion module.

BRIEF DESCRIPTION OF THE FIGURES

FIG. 7C is a perspective view of the arch expander used by the orthodontic appliance of FIGS. 7A and 7B.

FIG. 7D is a top view of the arch expander shown in FIG. 7C.

FIG. 7E is a left side view of the arch expander shown in FIG. 7D.

FIG. 7F is a front view of the arch expander shown in FIG. 7D.

DETAILED DESCRIPTION

Figure 1:
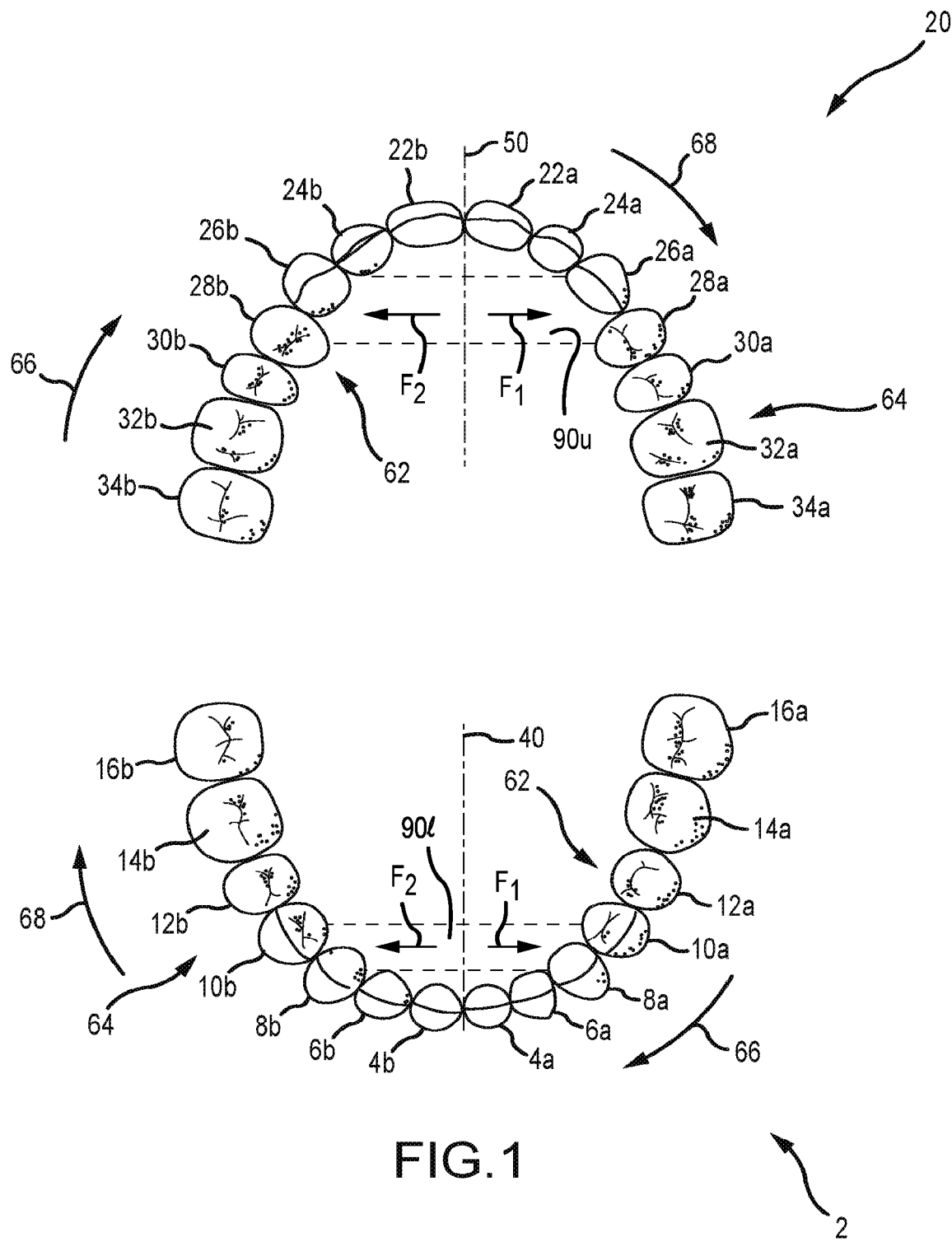
FIG. 1 is an occlusal view of a representative lower arch/dentition and a representative upper arch/dentition, annotated to include expansion force zones used by the orthodontic appliances addressed herein.

FIG. 1 illustrates a lower dental arch or dentition 2, along with an upper dental arch or dentition 20 of a patient. The lower dentition 2 generally includes the same type of teeth on each side of a midline 40 thereof. Teeth on one side of the midline 40 include an "a" designation, while teeth on the opposite side of the midline 40 include a "b" designation. The lower dentition 2 includes the following teeth: a lower central 4a and 4b (or central incisor), a lower lateral 6a and 6b (or lateral incisor), a lower cuspid 8a and 8b (also referred to as a deciduous canine in a mixed dentition), a lower first bicuspid 10a and 10b (also referred to as a first deciduous molar in a mixed dentition), a lower second bicuspid 12a and 12b (also referred to as a second deciduous molar in a mixed dentition), a lower first molar 14a and 14b, and a lower second molar 16a and 16b. The third molars or wisdom teeth for the lower dental arch 2 are not shown in FIG. 1. The upper dental arch 20 generally includes the same type of teeth on each side of a midline 50 thereof. Teeth on one side of the midline 50 include an "a" designation, while teeth on the opposite side of the midline 50 include a "b" designation. The upper dentition 20 includes the following teeth: an upper central 22a and 22b (or central incisor), an upper lateral 24a and 24b (or lateral incisor), an upper cuspid 26a and 26b (also referred to as a deciduous canine in a mixed dentition), an upper first bicuspid 28a and 28b (also referred to as a first deciduous molar in a mixed dentition), an upper second bicuspid 30a and 30b (also referred to as a second deciduous molar in a mixed dentition), an upper first molar 32a and 32b, and an upper second molar 34a and 34b. The third molars or wisdom teeth for the upper dentition 20 are not shown in FIG. 1.

The lingual for each of the lower dentition 2 and the upper dentition 20 is identified by reference numeral 62 in FIG. 1 (e.g., the tongue side of the corresponding dentition), while the buccal for each of the lower dentition 2 and the upper dentition 20 is identified by reference numeral 64. The mesial direction is identified by the arrow 66, while the distal direction is identified by the arrow 68 in FIG. 1 ("mesial" and "distal" being defined in relation to the midline of the corresponding dentition; e.g., the mesial direction on a given side of a given dentition means proceeding in the direction of the corresponding midline and along the corresponding dentition).

The various embodiments of orthodontic appliances addressed herein provide for expansion of the dentition on which the appliance is installed. This expansion is affected by exerting a first expansion force on one side of the corresponding dentition and that is defined by force vector $F_1$ in FIG. 1 (an axial or axially-directed force), and by simultaneously exerting a second expansion force on the opposite side of the corresponding dentition and that is defined by force vector $F_2$ in FIG. 1 (an oppositely directed axial or axially-directed force). These two expansion forces are collinear with one another, but with the corresponding force vectors $F_1$ and $F_2$ (the "direction" of the force) extending in opposite directions. The force vector $F_1$ extends away from the midline of the corresponding dentition in a first direction, while force vector $F_2$ extends away from the midline of the corresponding dentition in an opposite, second direction.

A single expansion module generates the expansion forces for the various orthodontic appliances addressed herein, namely force vectors $F_1$ and $F_2$, and this expansion module may be positioned such that both the force vector $F_1$ and the force vector $F_2$ are located within an expansion module zone 90u for the case of the upper dentition 20, or are located within an expansion module zone 90l for the case of the lower dentition 2. The expansion module zones 90u and 90l are defined between the corresponding pair of dashed lines in FIG. 1, and in the illustrated embodiment extend from a location coinciding with the cuspids (also referred to as the canines) to a location coinciding with the first bicuspids in the case of a permanent dentition (or extend from a location coinciding with the deciduous canines to a location coinciding with the first deciduous molars in the case of a mixed dentition). As such, the distalmost or posterior-most location of where the force vectors $F_1$ and $F_2$ intersect the corresponding dentition coincides with a location of the first bicuspids in the case of a permanent dentition (or coincides with a location of the first deciduous molars in the case of a mixed dentition). Typically, the force vector $F_1$ and the force vector $F_2$ will be located within the relevant expansion module zone 90u (upper dentition 20) or expansion module zone 90l (lower dentition 2) so as to intersect with the corresponding dentition at a location that corresponds with the cuspids (also referred to as the canines) in the case of a permanent dentition, or at a location that corresponds with the deciduous canines in the case of a mixed dentition.

The above-noted expansion forces (again, represented by force vectors $F_1$ and $F_2$) are applied to the corresponding dentition by the orthodontic appliances addressed herein by anchoring to multiple teeth on each side of the corresponding dentition, but where at least the centrals and laterals of the corresponding dentition are not utilized to provide an anchoring function for these orthodontic treatment forces. The anterior-most anchoring tooth on each side of the relevant dentition may be a deciduous canine in the case of a mixed dentition, or may be a first bicuspid in the case of a permanent dentition. Therefore, the orthodontic appliances addressed herein may be characterized as being anchored to the relevant dentition within one tooth of where the vector of each of the expansion forces intersects with this dentition.

Figure 2A:
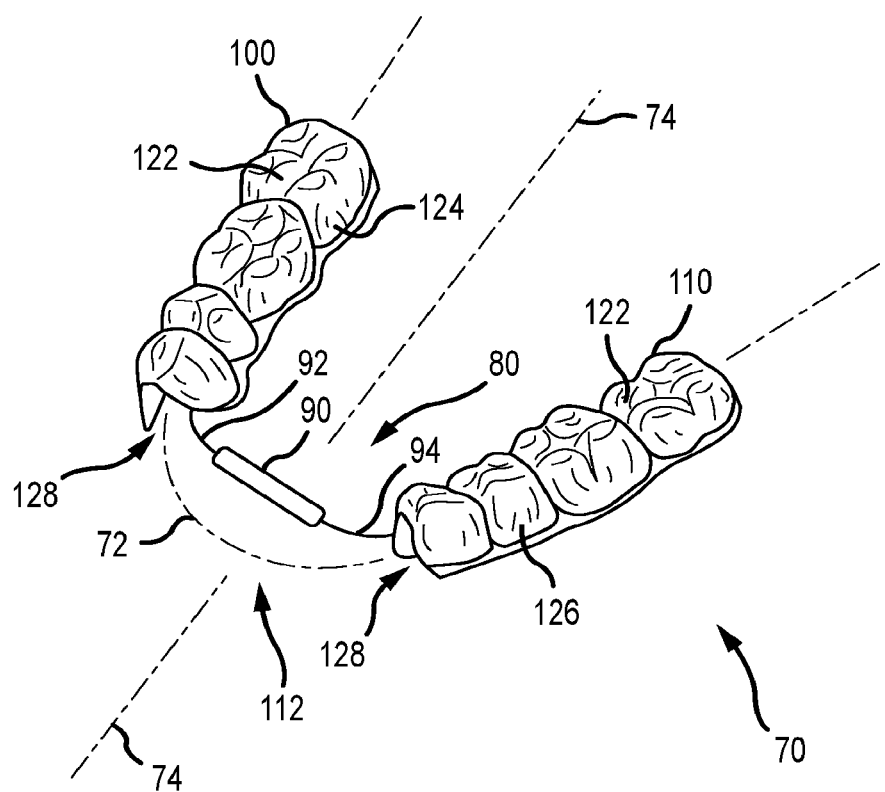
FIG. 2A is a perspective view of one embodiment of an orthodontic appliance that uses an arch expander that is anchored to a pair of segments disposed on opposite sides of a patient's dentition and that each capture multiple teeth.

FIG. 2A illustrates one embodiment of an orthodontic appliance 70 that uses an arch expander 80 that is integrated with a first segment 100 and a second segment 110. The arch expander 80 includes an expansion or force module 90, a first leg 92 that is appropriately anchored to the first segment 100, and a second leg 94 that is appropriately anchored to the second segment 110. The first segment 100 is disposed on one side of a reference plane 74 that will typically coincide with a midline when the orthodontic appliance 70 is installed on a patient's dentition or dental arch (e.g., an upper dentition or a lower dentition). The second segment 110 is disposed on the opposite side of this same reference plane 74 when the orthodontic appliance 70 is installed on this same dentition.

The orthodontic treatment forces exerted on the relevant dentition by the orthodontic appliance 70 are in accordance with the above-discussed force vectors $F_1$ and $F_2$. A single expansion force is exerted on the first leg 92 (by one of the axial forces $F_1$ and $F_2$ output by the expansion module 90), while a single expansion force is exerted on the second leg 94 (by the other of the axial forces $F_1$ and $F_2$ output by the expansion module 90).

The first leg 92 and second leg 94 each may be entirely in the form of a wire (e.g., round, square, rectangular). In any case, the first leg 92 may interface with the first segment 100 along at least a substantial portion of its length, while the second leg 92 may interface with the second segment 110 along at least a substantial portion of its length. Another characterization is that both the first leg 92 and second leg 94 extend along a corresponding portion of the dentition so as to coincide with at least 3 teeth of this dentition.

Both the first segment 100 and the second segment 110 are disposed over multiple teeth (e.g., at least three teeth, typically adjacently disposed to one another) when the orthodontic appliance 70 is in an installed configuration (e.g., either on the upper dentition or lower dentition). Notably, there is a gap 112 in the orthodontic appliance 70 when proceeding along a dentition axis 72 between the anterior portion of the first segment 100 and the anterior portion of the second segment 110. This dentition axis 72 at least generally approximates the dentition for which the orthodontic appliance 70 is configured. In any case and based upon this gap 112, expansion of a posterior portion of the dentition by the orthodontic appliance 70 (e.g., portions corresponding with the first segment 100 and second segment 110) makes space to correct crowding of anterior teeth in this same dentition (e.g., anteriorly-disposed teeth that are not engaged by either the first segment 100 or second segment 110). In the case of a permanent dentition and in one embodiment, the gap 112 corresponds with the centrals, laterals, and cuspids (e.g., the first segment 100 and second segment 110 do not extend over the corresponding central, lateral, and cuspid, but the segments 100, 110 do extend over at least the corresponding first bicuspid, second bicuspid, and first molar). In the case of a mixed dentition and in one embodiment, the gap 112 corresponds with the centrals and laterals (e.g., the first segment 100 and second segment 110 do not extend over the corresponding central and lateral, but the segments 100, 110 do extend over at least the corresponding deciduous canine, first deciduous molar, and second deciduous molar).

The expansion module 90 is oriented at least generally transversely to the reference plane 74 (e.g., at least generally orthogonally to the reference plane 74), and thereby biases both the first segment 100 and the second segment 110 away from one another (and thereby away from the reference plane 74) to exert an expansive force on a dentition on which the orthodontic appliance 70 is installed (e.g., on portions of the dentition that are engaged by the first segment 100 and the second segment 110). The above-noted force vectors $F_1$ and $F_2$ may be also be characterized as acting on the corresponding leg 92, 94. A spacing exists between the expansion module 90 and an apex or closed end of the dentition axis 72 such that the expansion module 90 will be located posteriorly of the patient's anterior teeth when the orthodontic appliance 70 is in an installed configuration. In the illustrated embodiment the arch expander 80 provides the only/sole structural connection between the first segment 100 and second segment 110 for the orthodontic appliance 70.

There are a number of options for integrating the arch expander 80, namely its first leg 92 and second leg 94, with the first segment 100 and the second segment 110. FIGS. 2B-2F illustrate representative integrations, and each may be used by each of the first segment 100 and second segment 110. The orthodontic segments shown in FIGS. 2B-2F each include an occlusal wall 122 (e.g., disposed over at least part of the occlusal surface of the corresponding teeth), a lingual wall 124 (e.g., disposed over at least part of the lingual surface of the corresponding teeth), and a buccal wall 126 (e.g. disposed over at least part of the buccal surface of the corresponding teeth) that collectively define a cavity 128 for receiving at least an upper portion of the corresponding teeth. The occlusal wall 122 includes an external surface 122a and an oppositely disposed internal surface 122b. The lingual wall 124 includes an external surface 124a (facing the tongue) and an oppositely disposed internal surface 124b. The buccal wall 126 includes an external surface 126a (facing the cheek) and an oppositely disposed internal surface 126b.

Figure 2B:
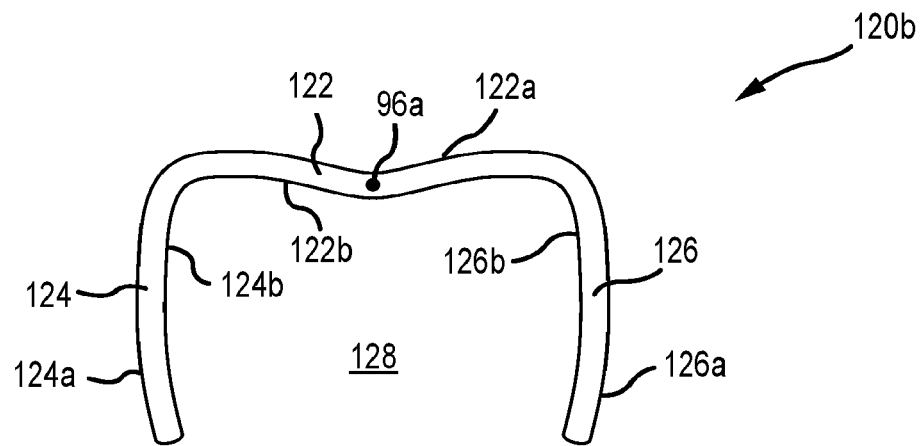
FIG. 2B is a cutaway view of a segment for the orthodontic appliance of FIG. 2A, where the associated leg of the arch expander includes an embedded occlusal section.
Figure 2C:
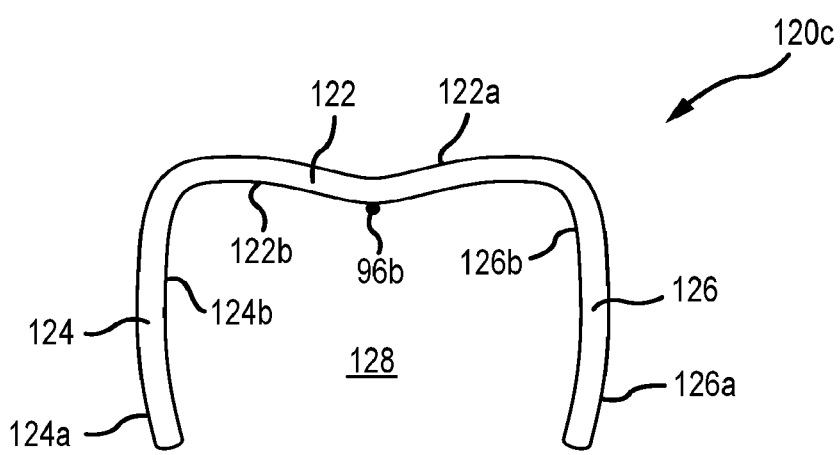
FIG. 2C is a cutaway view of a segment for the orthodontic appliance of FIG. 2A, where the associated leg of the arch expander includes an occlusal section that is anchored to an interior surface of an occlusal wall for this segment.
Figure 2D:
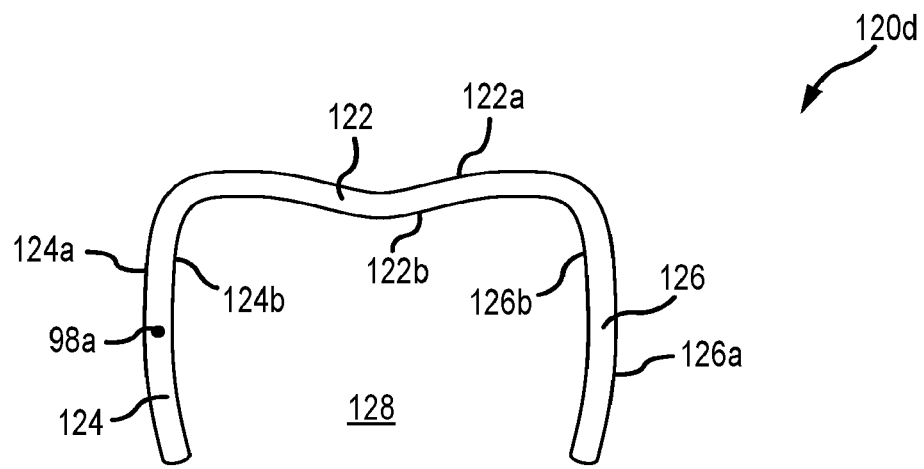
FIG. 2D is a cutaway view of a segment for the orthodontic appliance of FIG. 2A, where the associated leg of the arch expander includes an embedded lingual section.
Figure 2E:
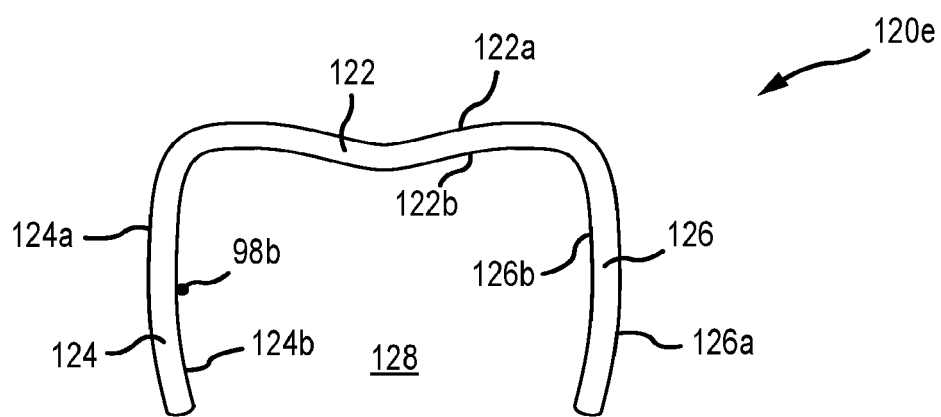
FIG. 2E is a cutaway view of a segment for the orthodontic appliance of FIG. 2A, where the associated leg of the arch expander includes a lingual section that is anchored to an interior surface of a lingual wall for this segment.
Figure 2F:
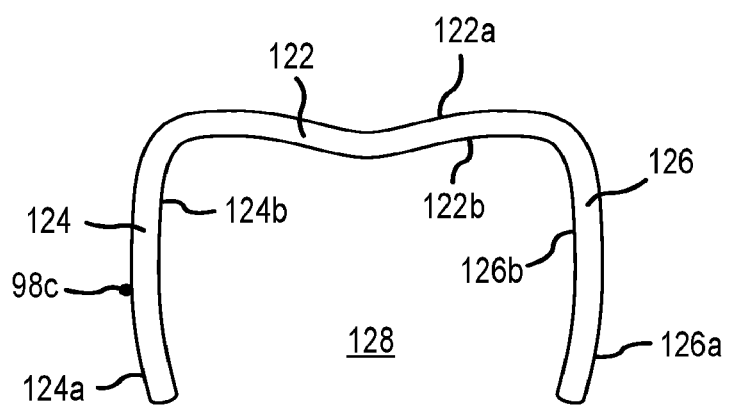
FIG. 2F is a cutaway view of a segment for the orthodontic appliance of FIG. 2A, where the associated leg of the arch expander includes a lingual section that is anchored to an exterior surface of a lingual wall for this segment.

FIG. 2B illustrates a segment 120b (e.g., first segment 100; second segment 110), where the corresponding leg (e.g., first leg 92; second leg 94) for the arch expander 80 includes an occlusal section 96a that is embedded in its occlusal wall 122. FIG. 2C illustrates a segment 120c (e.g., first segment 100; second segment 110), where the corresponding leg (e.g., first leg 92; second leg 94) for the arch expander 80 includes an occlusal section 96b that is fixed to the internal surface 122b of its occlusal wall 122. FIG. 2D illustrates a segment 120d (e.g., first segment 100; second segment 110), where the corresponding leg (e.g., first leg 92; second leg 94) for the arch expander 80 includes a lingual section 98a that is embedded in its lingual wall 124. FIG. 2E illustrates a segment 120e (e.g., first segment 100; second segment 110), where the corresponding leg (e.g., first leg 92; second leg 94) for the arch expander 80 includes an lingual section 98b that is fixed to the internal surface 124b of its lingual wall 124. FIG. 2F illustrates a segment 120f (e.g., first segment 100; second segment 110), where the corresponding leg (e.g., first leg 92; second leg 94) for the arch expander 80 includes an lingual section 98c that is fixed to the external surface 124a of its lingual wall 124.

Expansion of the corresponding dentition or dental arch is realized through anchoring the arch expander 80 to the relevant dentition via the first segment 100 and second segment 110. In this regard, preferably the segments 100, 110 are each in the form of at least substantially rigid structures for transmitting the expansion forces to the corresponding dentition or dental arch (e.g., an Essex material; a material(s) used to make aligners, retainers, or the like). The first segment 100 and the second segment 110 of the orthodontic appliance 70 also may be characterized as autonomous structures, for instance being of an integral or one-piece construction or configuration.

Each of the segments 100, 110 may be characterized as being in the form of an overlay, cover, cap, or the like, and again include an occlusal wall 122 that extends between its corresponding lingual wall 124 and buccal wall 126 to collectively define a cavity 128. One embodiment has each of the segments 100, 110 being in the form of a passive component—the segments 100, 110 may be configured so as to not move corresponding teeth in the absence of activation of the expansion module 90. In this regard, the internal surfaces that define the cavity 128 may be at least substantially complementarily-shaped with regard to interfacing surfaces of the corresponding teeth (e.g., an internal surface 122b of the occlusal wall, an internal surface 124b of the lingual wall 124, and an internal surface 126b of the buccal wall 126 of a given segment 100, 110 may be shaped to at least substantially approximate an adjacent tooth surface). Stated another way, the interior cavity 128 for each of the segments 100, 110 is typically not shaped to itself exert an orthodontic treatment force on the corresponding teeth (e.g., the interior cavity 128 of a given segment 100, 110 need not be configured to itself induce tipping, torqueing, translation, or the like of any corresponding teeth). Instead, the entirety of the treatment forces that are transmitted to the dentition by each of the segments 100, 110 are from activation of the arch expander 80 (e.g., the segments 100, 110 are anchors for the arch expander 80; the segments 100, 110 are force-transmitting components, not force-generating components).

The orthodontic appliance 70 may be adapted for installation on a permanent dentition. In this case, the first segment 100 will typically receive a first bicuspid (e.g., first bicuspid 10a or 28a), a second bicuspid (e.g., second bicuspid 12a or 30a), and a first molar (e.g., first molar 14a or 32a) on one side of the dentition (the segment 100 could also receive a second molar (e.g., second molar 16a, 34a) on this same side of the dentition), while the second segment 110 will typically receive a first bicuspid (e.g., first bicuspid 10b or 28b), a second bicuspid (e.g., second bicuspid 12b or 30b), and a first molar (e.g., first molar 14b or 32b) on an opposite side of the dentition (the segment 110 could also receive a second molar (e.g., second molar 16b, 34b) on this same side of the dentition). The centrals of the corresponding dentition (e.g., centrals 4a, 4b or 22a, 22b), laterals of the corresponding dentition (e.g., laterals 6a, 6b or 24a, 24b), and cuspids of the corresponding dentition (e.g., cuspids 8a, 8b or 26a, 26b) will be exposed relative to the orthodontic appliance 70—typically neither the segment 100 nor the segment 110 will extend over these anterior teeth in the case of a permanent dentition. Therefore, arch expansion forces are not transmitted to these anterior teeth of the dentition by the segments 100, 110.

The orthodontic appliance 70 may also be adapted for installation on a mixed dentition. In this case, the first segment 100 will typically receive a first deciduous canine (e.g., tooth 8a or 26a), a first deciduous molar (e.g., tooth 10a or 28a), a second deciduous molar (e.g., tooth 12a, 30a), and a first permanent molar (e.g., first molar 14a or 32a) on one side of the dentition, while the second segment 110 will typically receive a first deciduous canine (e.g., tooth 8b or 26b), a first deciduous molar (e.g., tooth 10b or 28b), a second deciduous molar (e.g., tooth 12b, 30b), and a first permanent molar (e.g., first molar 14b or 32b) on one opposite side of the dentition. The centrals of the corresponding dentition (e.g., centrals 4a, 4b or 22a, 22b) and laterals of the corresponding dentition (e.g., laterals 6a, 6b or 24a, 24b) will be exposed relative to the orthodontic appliance 70—typically neither the segment 100 nor the segment 110 will extend over these anterior teeth in the case of a mixed dentition. Therefore, arch expansion forces are not transmitted to these anterior teeth of the dentition by the segments 100, 110.

There are a number of options for fabricating the orthodontic appliance 70 and the various other orthodontic appliances addressed herein with regard to the integration of the arch expander 80 with the segments 100, 110. Initially, the segments 100, 110 each may be based on what is commonly referred to as a "preform." The segments 100, 110 also be defined by a vacuum-forming operation and an appropriate model of at least the corresponding portion of the corresponding dentition.

An occlusal section 96a of the arch expander 80 may be embedded in the occlusal wall 122 of a segment 120b (FIG. 2B) by: 1) forming a first layer on a model of the corresponding dentition (e.g., using a vacuum); 2) positioning an occlusal section 96a on and appropriately anchoring this occlusal section 96a to this first layer; and 3) forming a second layer over the first layer and this occlusal section 96a (e.g., using a vacuum) to embed the occlusal section 96a therebetween.

An occlusal section 96b of the arch expander 80 may be integrated with the internal surface 122b of the occlusal wall 122 of a segment 120c (FIG. 2C) by: 1) positioning and appropriately attaching this occlusal section 96b to the occlusal surface of a corresponding portion of a model for the corresponding dentition; and 2) thereafter forming the segment 120c over this occlusal section 96b and a corresponding portion of the model.

A lingual section 98a of the arch expander 80 may be embedded in the lingual wall 124 of a segment 120d (FIG. 2D) by: 1) forming a first layer on a model of the corresponding dentition (e.g., using a vacuum); 2) positioning a lingual section 98a on and appropriately anchoring this lingual section 98a to this first layer; and 3) forming a second layer over the first layer and this lingual section 98a (e.g., using a vacuum) to embed the lingual section 98a therebetween.

A lingual section 98b of the arch expander 80 may be integrated with the internal surface 124b of the lingual wall 124 of a segment 120e (FIG. 2E) by: 1) positioning and appropriately attaching this lingual section 98b to the lingual surface of a corresponding portion of a model for the corresponding dentition; and 2) thereafter forming the segment 120d over this lingual section 98b and corresponding portion of the model.

A lingual section 98c of the arch expander 80 may be integrated with the external surface 124a of the lingual wall 124 of a segment 120f (FIG. 2F) by: 1) forming/positioning the segment 120f over a corresponding portion of a model for the corresponding dentition; and 2) positioning and appropriately attaching this lingual section 98c to the external surface 124a of the lingual wall 124 of the segment 120f while still mounted on the model.

Figure 3:
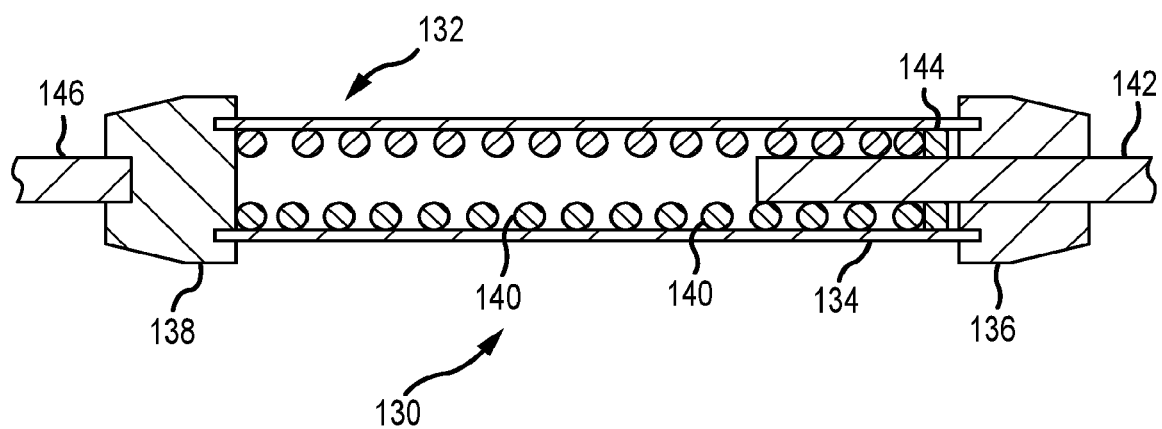
FIG. 3 is a cross-sectional view of a representative embodiment of an expansion module of an arch expander for an orthodontic appliance of the type shown in FIG. 2A.

One embodiment of an expansion or force module is illustrated in FIG. 3, is identified by reference numeral 130, and may be used by the various orthodontic appliances addressed herein, including as the expansion or force module 90 for the orthodontic appliance 70 of FIG. 2A, as well as for the expansion or force module 180 of the orthodontic appliances 150, 220, 240, and 150' that are addressed below. The expansion module 130 includes a housing 132 collectively defined by a sidewall 134, a collar/endcap 138 disposed at one end of the housing 132 and appropriately fixed to its sidewall 134 (e.g., welded, brazed, adhered), a collar/endcap 136 disposed at the opposite end of the housing 132 and appropriately fixed to its sidewall 134 (e.g., welded, brazed, adhered), and at least one hollow spring 140 or other appropriate biasing member (e.g., a nickel titanium spring) that is disposed within the housing 132 (e.g., the spring 140 is enclosed by the housing 132). One end of this spring 140 is seated against the collar 138. The opposite end of this spring 140 is at least engageable with a head 144 that is appropriately fixed (e.g., welded, brazed, bonded) to an arch expander end section 142 (e.g., one of the first leg 92 or second leg 94 of orthodontic appliance 70). The outer perimeter of the head 144 and the inner perimeter of the sidewall 134 may be complimentarily-shaped and may be generally of about the same magnitude, with the outer perimeter of the head 144 preferably being slightly less than the inner perimeter of the sidewall 134 to reduce the frictional interface therebetween. One embodiment has both the interior surface of the sidewall 134 and the perimeter or outer surface of the head 144 being cylindrical (e.g., to allow the end section 142 to both rotate relative to and move axially relative to the housing 132 (or more generally the expansion module 130)). Another embodiment has both the interior surface of the sidewall 134 and the perimeter or outer surface of the head 144 being square or rectangular (e.g., to limit relative motion between the end section 142 and the housing 132 (or more generally the expansion module 130) to relative axial motion.

The arch expander end section 142 may extend through the collar 136 and into the hollow center of the spring 140. That is, the arch expander end section 142 may extend through one end of the housing 132 (e.g., through an appropriate aperture in the collar 136), through the head 144 (e.g., through an appropriate hole in the head 144), and within an interior location of the spring 140. In any case, the arch expander end section 142 is appropriately anchored to the head 144. The arch expander end section 142 is able to move relative the collar 136 at least generally along the length dimension of the housing 132, namely along an axial path, by a sliding-like action of the head 144 relative to the housing 132. An arch expander end section 146 (e.g., the other of the first leg 92 or second leg 94 of orthodontic appliance 70) is appropriately fixed (e.g., welded, brazed, bonded) to the collar 138 at the opposite end of the housing 132, and thereby remains stationary relative to the collar 138. It should be appreciated that the arch expander end section 142 is thereby able to move relative to the arch expander end section 146 by a compression/expansion of the spring 140 between the head 144 and the collar 138. The spring 140 will initially be compressed to at least a degree when an orthodontic appliance using the expansion module 130 is installed on a patient's dentition. Subsequent expansion of the spring 140 (via a movement of the head 144 toward the collar 136, and thereby a movement of the arch expander end section 142 away from the arch expander end section 146) will exert a desired expansion force on the patient's corresponding dentition.

FIGS. 4A-4G present various views of an orthodontic appliance 150 that is configured for installation on the upper dentition 20 of a patient and that is otherwise in accordance with the orthodontic appliance 70 of FIG. 2A and its corresponding discussion unless otherwise noted to the contrary herein. Primary components of the orthodontic appliance 150 include an arch expander 160, a first segment 190, and a second segment 200 (e.g., the segments 190, 200 are in accordance with the segments 100, 110 addressed above), with each of the segments 190, 200 having an occlusal wall 210, a lingual wall 212, a buccal wall 214, and a cavity 216 for accommodating multiple teeth.

The arch expander 160 may be integrated with the first segment 190 and second segment 200 at least generally in accordance with FIG. 2B or FIG. 2C. In this regard, the arch expander 160 includes an expansion module 180, a first leg 162a, and a second leg 162b. The first leg 162a of the arch expander 160 includes a first occlusal section or segment 164a, a first end section or segment 172a that movably interfaces with the expansion module 180, and an interconnecting first transition 166a, with the first occlusal section 164a, first transition 166a, and first end section 172a being disposed in different orientations relative to one another. The first transition 166a includes a first transition section 168a that extends both gingivally (e.g., away from the occlusal) and anteriorly from the first occlusal section 164a, along with a second transition section 170a that extends at least anteriorly from the first transition section 168a. Similarly, the second leg 162b of the arch expander 160 includes a second occlusal section or segment 164b, a second end section or segment 172b that is fixed relative to the expansion module 180, and an interconnecting second transition 166b, with the second occlusal section 164b, second transition 166b, and second end section 172b being disposed in different orientations relative to one another. This second transition 166b includes a first transition section 168b that extends both gingivally (e.g., away from the occlusal) and anteriorly from the second occlusal section 164b, along with a second transition section 170b that extends at least anteriorly from the first transition section 168b. As such, the expansion module 180 is occlusally offset relative to both the first occlusal section 164a and the second occlusal section 164b. The first leg 162a interfaces with the first segment 190 along at least a substantial portion of the length of the first segment 190 (the length dimension coinciding with proceeding along the upper dentition 20), while the second leg 162b interfaces with the second segment 200 along at least a substantial portion of the length of the second segment 200 (the length dimension coinciding with proceeding along the upper dentition 20).

Figure 4A:
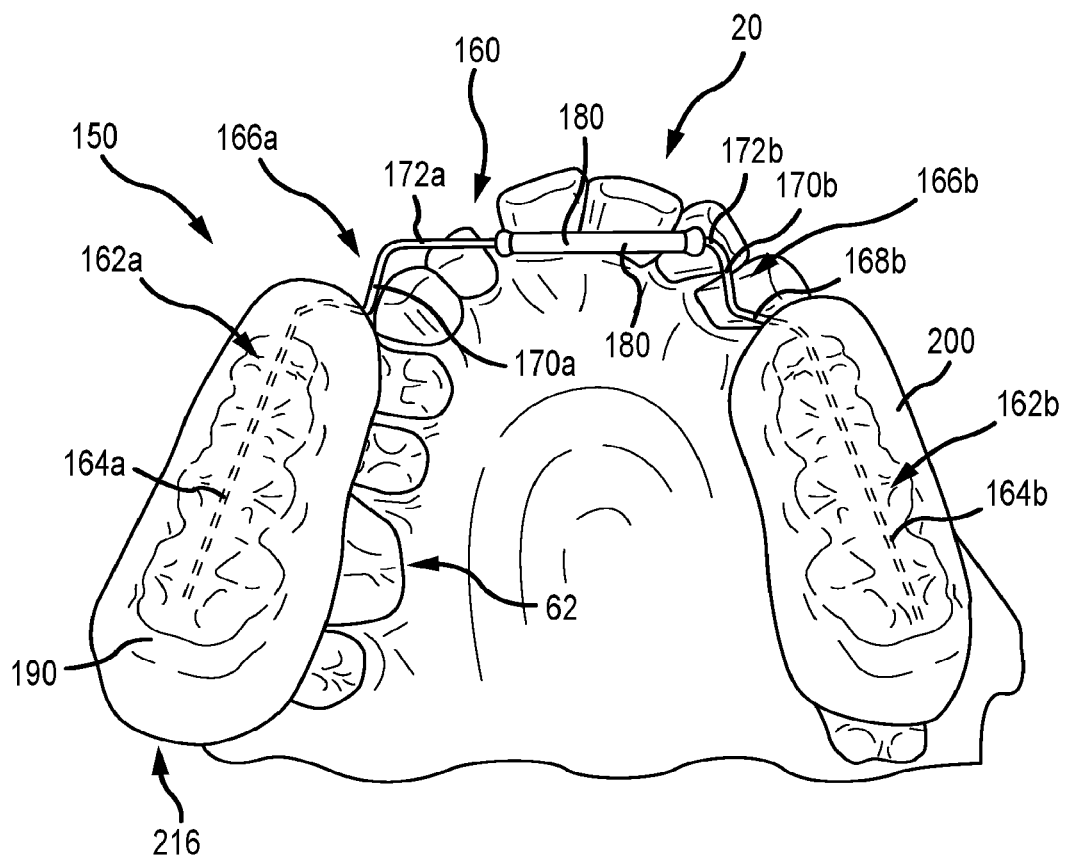
FIG. 4A is a perspective view of one embodiment of an orthodontic appliance that uses an arch expander that is anchored to an occlusal wall of pair of segments that are disposed on opposite sides of a patient's upper dentition and that each capture multiple teeth, where the orthodontic appliance is only partially installed on the upper dentition.
Figure 4B:
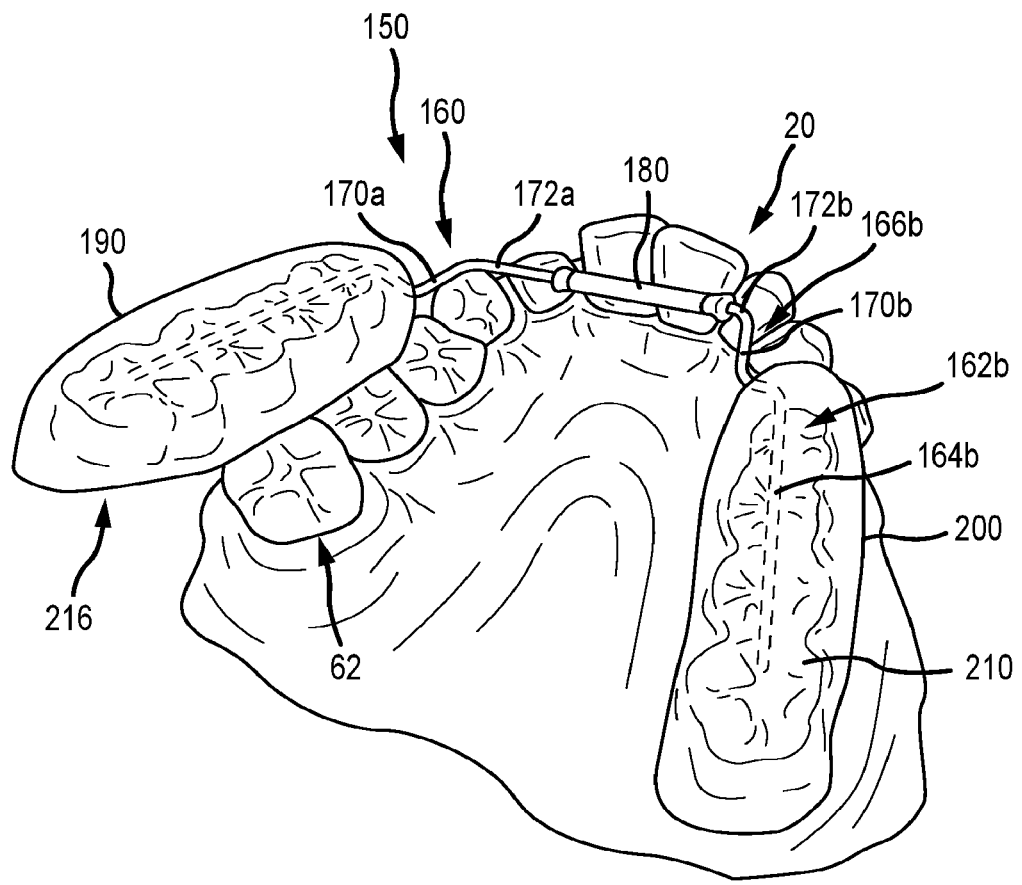
FIG. 4B is another perspective view of the configuration of the orthodontic appliance shown in FIG. 4A.
Figure 4C:
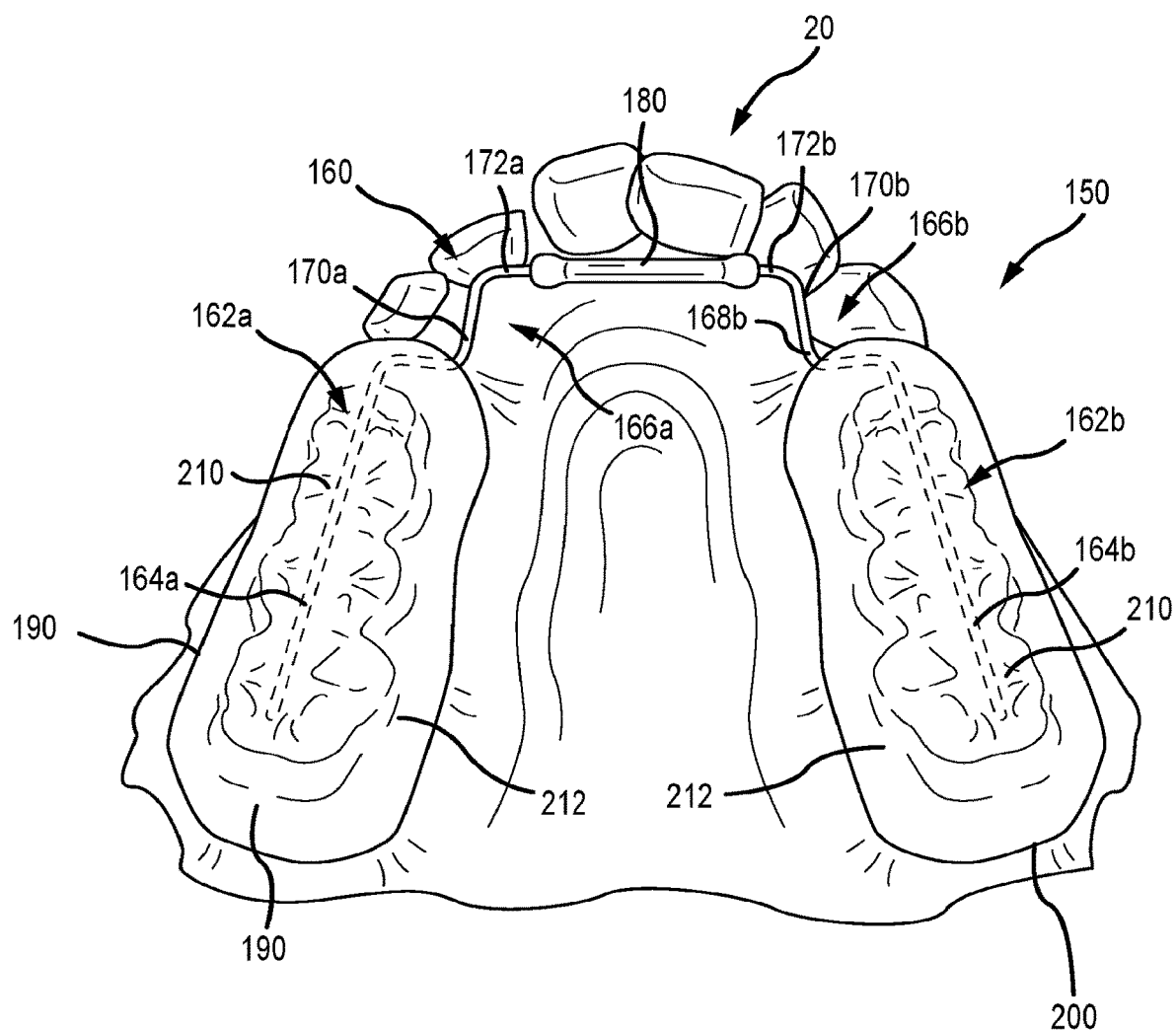
FIG. 4C is a perspective view of the orthodontic appliance of FIG. 4A, where the arch expander is in a contracted state such that both segments are installed on the upper dentition, but on opposite sides of its midline.
Figure 4D:
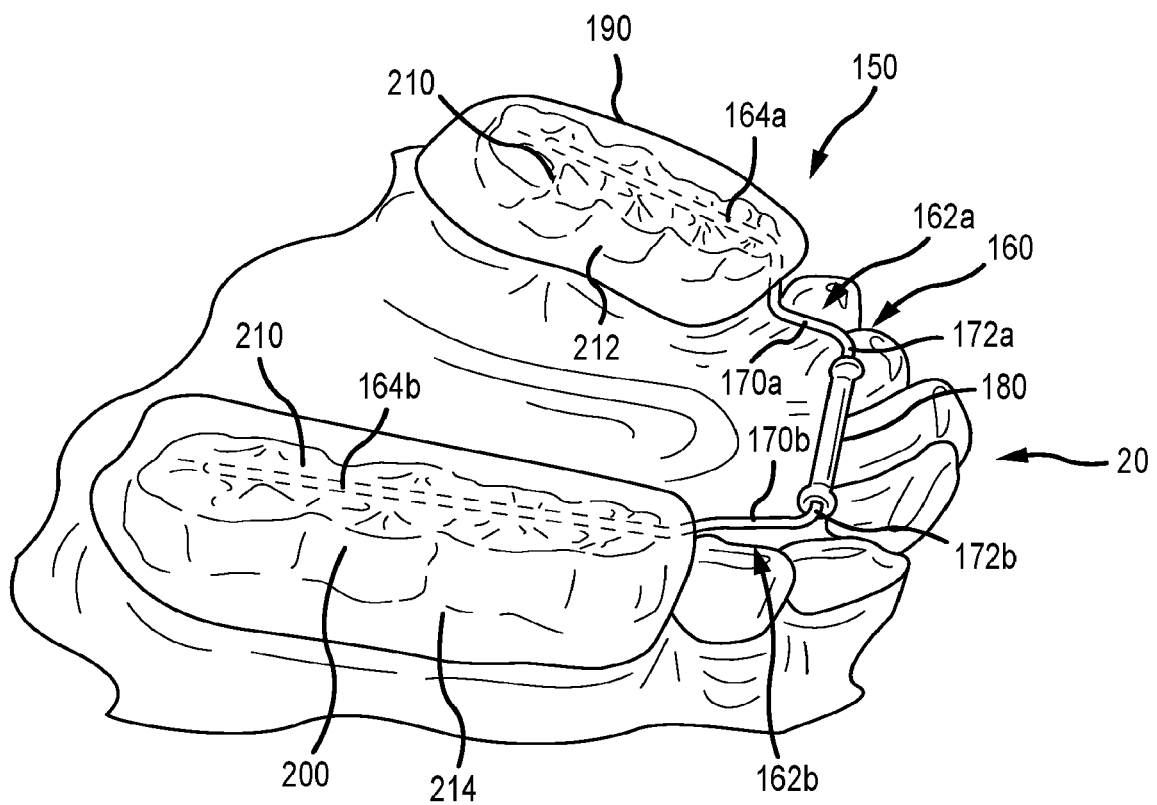
FIGS. 4D-4G are additional another perspective views of the configuration of the orthodontic appliance shown in FIG. 4C.
Figure 4E:
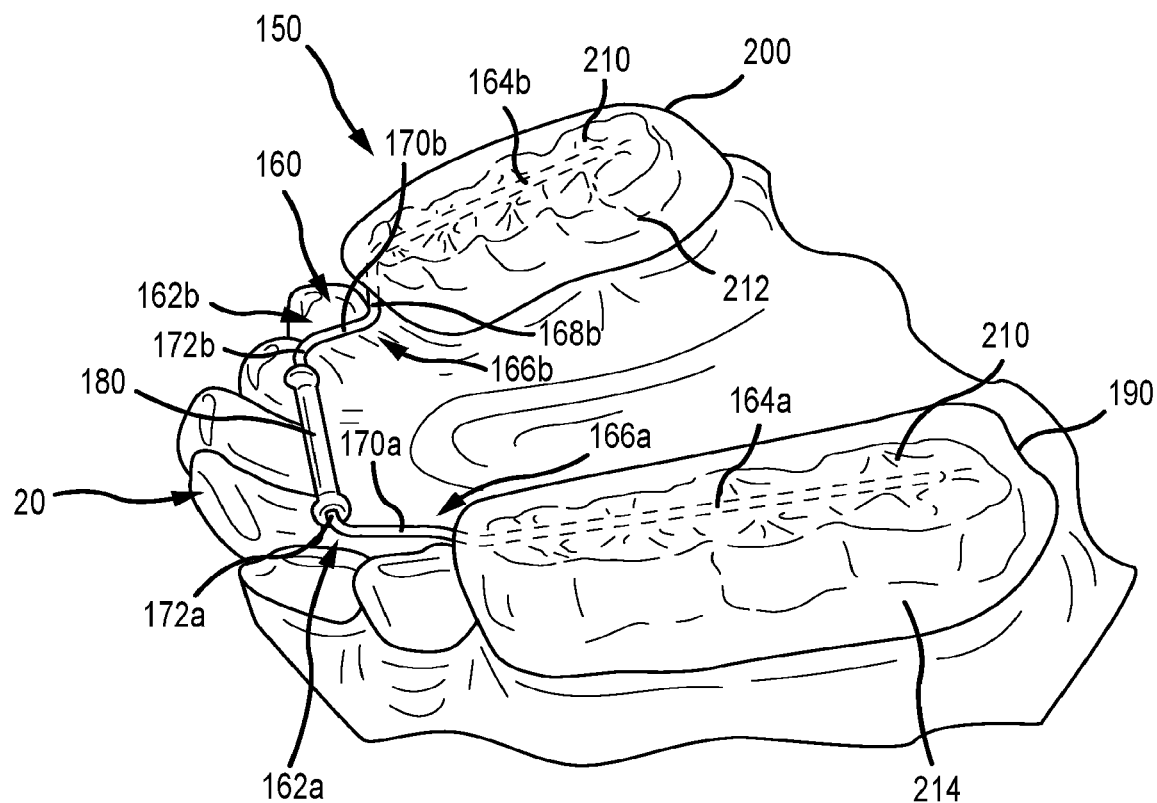
Figure 4F:
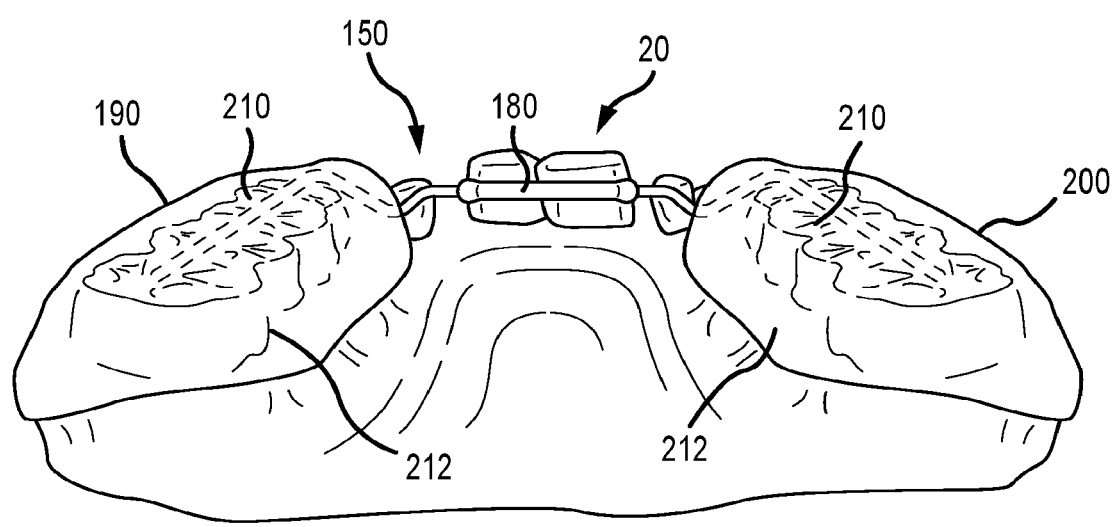
Figure 4G:
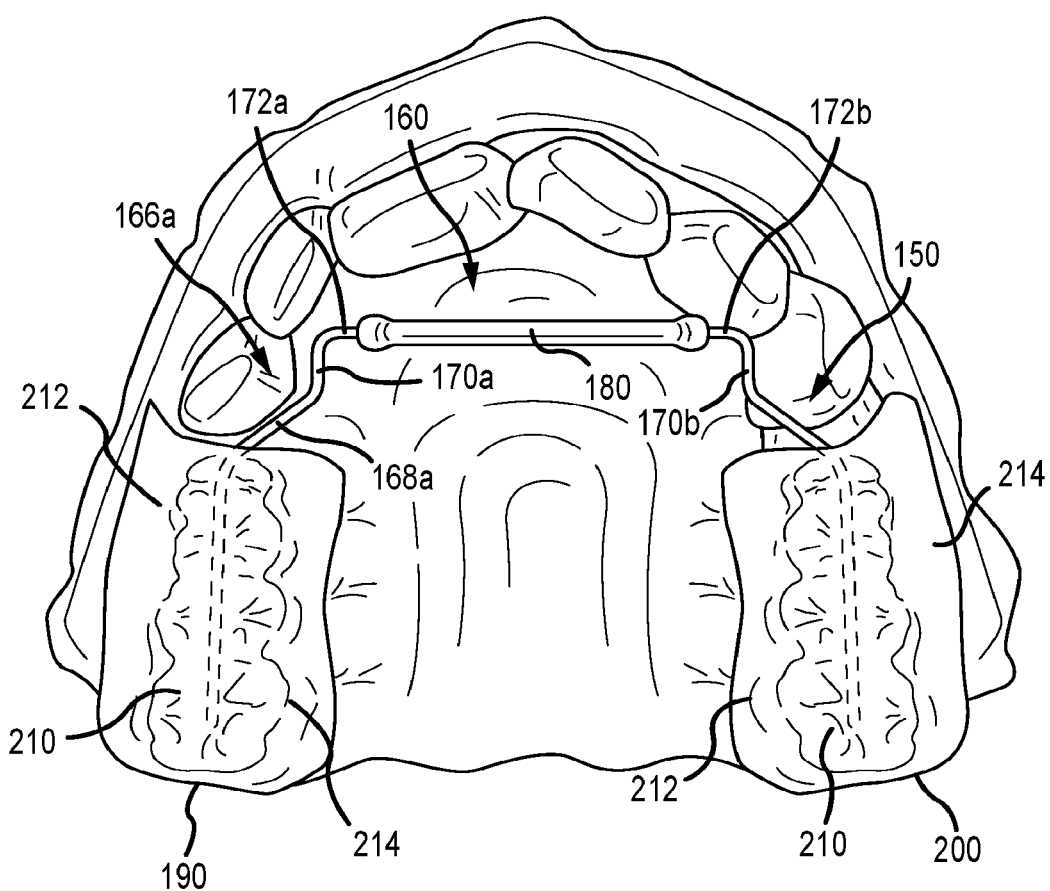

FIGS. 4A and 4B each illustrate the orthodontic appliance 150 being partially installed on the upper dentition 20, although the orthodontic appliance 150 could be installed on the lower dentition 2. Specifically, the second segment 200 is installed on the first bicuspid, the second bicuspid, and the first molar on one side of the upper dentition 20. The arch expander 160 is in an expanded state such that the first segment 190 is not installed on the first bicuspid, the second bicuspid, and the first molar on the opposite side of the upper dentition 20. In order to complete the installation of the orthodontic appliance 150, the first segment 190 may be pushed toward the second segment 200 while installed on the upper dentition 20, and thereafter the first segment 190 may be pushed toward the upper dentition 20 such that the corresponding first bicuspid, second bicuspid, and first molar are received in the cavity 216 of the first segment 190 (e.g., FIGS. 4C-4G). The orthodontic appliance 150 could be installed such that its first segment 190 and second segment 200 are simultaneously positioned on the corresponding portions of the upper dentition 20, for instance by compressing the arch expander 160 to align and then dispose the first segment 190 and second segment 200 on the corresponding portions of the upper dentition 20.

Consider the case where the first end section 172a of the first leg 162a for the arch expander 160 is circular or cylindrical. In addition to being axially movable relative to the expansion module 180, the first leg 162a (and thereby the first segment 190) may be rotated relative to the expansion module 180 at least generally about the first end section 172a (e.g., FIG. 4B). Another embodiment has the first end section 172a of the first leg 162a for the arch expander 160 being square or rectangular (and the interfacing portion of the expansion module 180 being complimentarily-shaped) such that relative motion between the first end section 172a and the expansion module 180 is at least substantially limited to relative axial motion.

In the case of the orthodontic appliance 150 being installed on a permanent upper dentition 20: 1) the expansion module 180 exerts collinear and oppositely-directed expansion forces ($F_1$ and $F_2$ in FIG. 1) on the upper dentition 20; 2) one of the expansion forces has a force vector that is typically oriented at least generally orthogonal to the midline of the upper dentition 20 and that intersects the upper dentition 20 on one side of this midline at a location associated with the corresponding cuspid, while the other of the expansion forces has a force vector that is also typically oriented at least generally orthogonal to the midline of the upper dentition 20 and that intersects the upper dentition 20 on the opposite side of this midline at a location associated with the corresponding cuspid; 3) the first segment 190 captures the first bicuspid, second bicuspid, and first molar on one side of the midline of the upper dentition 20 (the segment 190 does not capture the central, lateral, and cuspid on the same side of the midline); and 4) the second segment 200 captures the first bicuspid, second bicuspid, and first molar on the opposite side of the midline of the upper dentition 20 (the segment 200 does not capture the central, lateral, and cuspid on the same side of the midline).

FIGS. 5A-5D present various views of an orthodontic appliance 220 that is configured for installation on the upper dentition 20 of a patient and that is otherwise in accordance with the orthodontic appliance 70 of FIG. 2A and its corresponding discussion unless otherwise noted to the contrary herein. Primary components of the orthodontic appliance 220 include an arch expander 230, along with a first segment 190 and a second segment 200 in accordance with the foregoing. The arch expander 230 may be integrated with the first segment 190 and second segment 200 at least generally in accordance with FIG. 2D, FIG. 2E, or FIG. 2F. In this regard, the arch expander 230 includes an expansion module 180, a first leg 232a, and a second leg 232b. The first leg 232a of the arch expander 230 includes a first lingual section or segment 234a and a first end section or segment 236a that is fixed relative to the expansion module 180, with the first lingual section 234a and first end section 236a being disposed in different orientations. Similarly, the second leg 232b of the arch expander 230 includes a second lingual section or segment 234b and a second end section or segment 236b that movably interfaces with the expansion module 180, with the second lingual section 234b and second end section 236b being disposed in different orientations. The expansion module 180, the first leg 232a, and the second leg 232b may be disposed in at least generally coplanar relation when the orthodontic appliance 220 is in an installed configuration. The first leg 232a interfaces with the first segment 190 along at least a substantial portion of the length of the first segment 190 (the length dimension coinciding with proceeding along the upper dentition 20), while the second leg 232b interfaces with the second segment 200 along at least a substantial portion of the length of the second segment 200 (the length dimension coinciding with proceeding along the upper dentition 20).

Figure 5A:
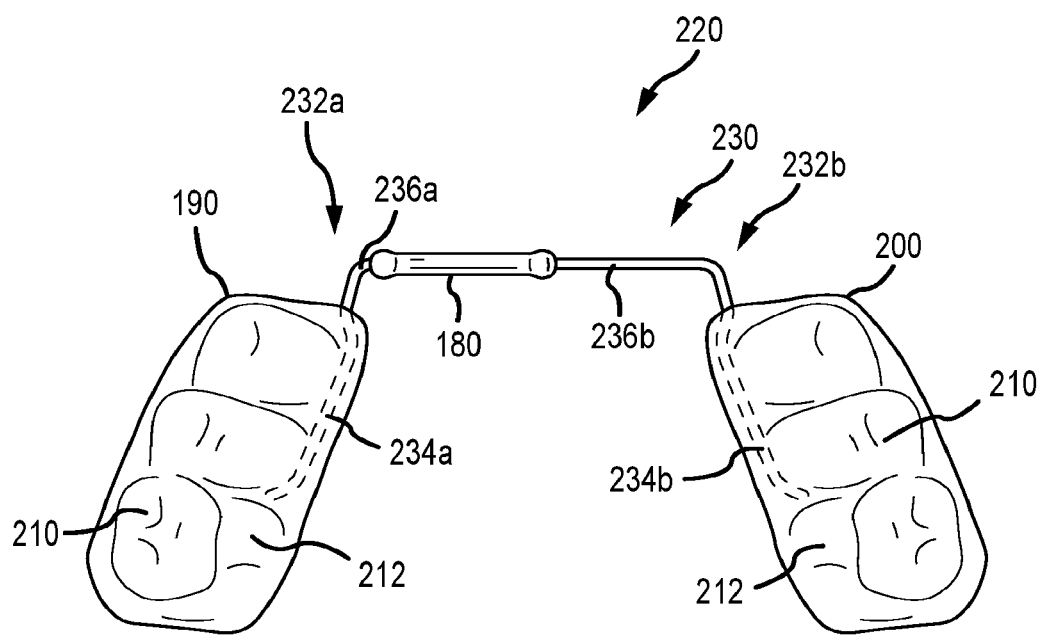
FIG. 5A is a perspective view of one embodiment of an orthodontic appliance that uses an arch expander that is anchored to a lingual wall of a pair of segments that are disposed on opposite sides of a patient's upper dentition and that each capture multiple teeth, and where the arch expander is in a fully expanded state.
Figure 5B:
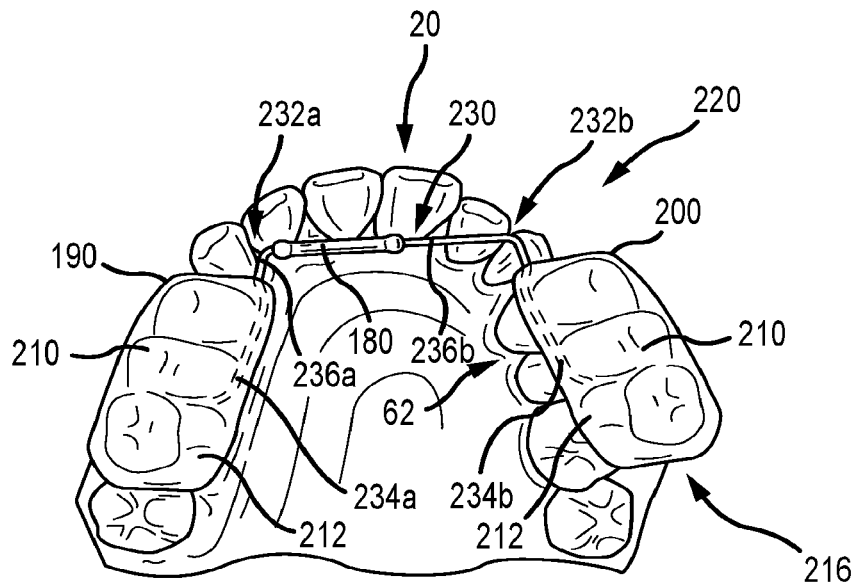
FIG. 5B is a perspective view of the orthodontic appliance of FIG. 5A being only partially installed on an upper dentition.
Figure 5C:
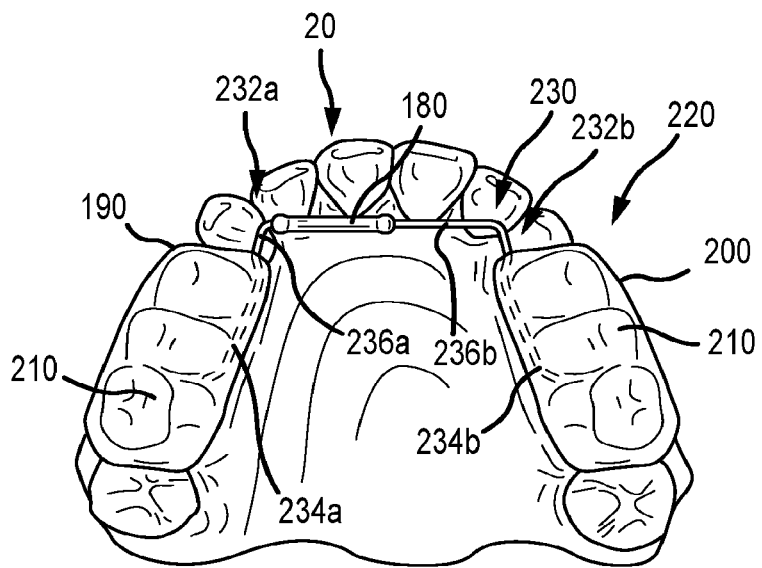
FIGS. 5C and 5D are perspective views of the orthodontic appliance of FIG. 5A being fully installed on an upper dentition.
Figure 5D:
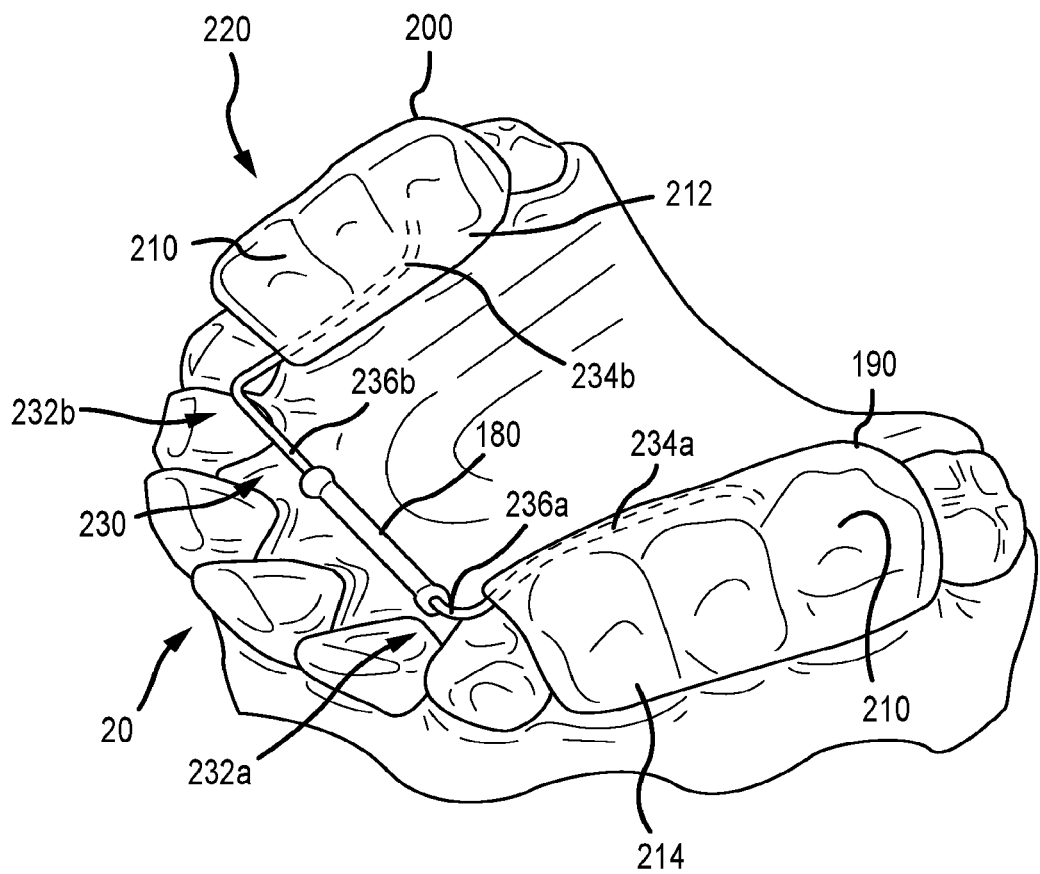

FIG. 5B illustrates the orthodontic appliance 220 being partially installed on the upper dentition 20. Specifically, the first segment 190 is installed on the first bicuspid, the second bicuspid, and the first molar on one side of the upper dentition 20. The arch expander 230 is in an expanded state such that the second segment 200 is not installed on the first bicuspid, the second bicuspid, and the first molar on the opposite side of the upper dentition 20. In order to complete the installation of the orthodontic appliance 220, the second segment 200 may be pushed toward the first segment 190 while installed on the upper dentition 20, and thereafter the second segment 200 may be pushed toward the upper dentition 20 such that the corresponding first bicuspid, second bicuspid, and first molar are received in the cavity 216 of the second segment 200 and as shown in FIGS. 5C and 5D. The orthodontic appliance 220 could be installed such that its first segment 190 and second segment 200 are simultaneously positioned on the corresponding portions of the upper dentition 20, for instance by compressing the arch expander 230 to align and then dispose the first segment 190 and second segment 200 on the corresponding portions of the upper dentition 20.

Consider the case where the second end section 236b of the second leg 232b for the arch expander 230 is circular or cylindrical. In addition to being axially movable relative to the expansion module 180, the second leg 232b (and thereby the second segment 200) may be rotated relative to the expansion module 180 about the interconnecting portion of the second end section 236b. Another embodiment has the second end section 236b of the second leg 232b for the arch expander 230 being square or rectangular (and the interfacing portion of the force mode 180 being complimentarily-shaped) such that relative motion between the second end section 236b and the expansion module 180 is at least substantially limited to relative axial motion.

In the case of the orthodontic appliance 150 being installed on a permanent upper dentition 20: 1) the expansion module 180 exerts collinear and oppositely-directed expansion forces ($F_1$ and $F_2$ in FIG. 1) on the upper dentition 20; 2) one of the expansion forces has a force vector that is typically oriented at least generally orthogonal to the midline of the upper dentition 20 and that intersects the upper dentition 20 on one side of this midline at a location associated with the corresponding cuspid, while the other of the expansion forces has a force vector that is also typically oriented at least generally orthogonal to the midline of the upper dentition 20 and that intersects the upper dentition 20 on the opposite side of this midline at a location associated with the corresponding cuspid; 3) the first segment 190 captures the first bicuspid, second bicuspid, and first molar on one side of the midline of the upper dentition (the segment 190 does not capture the central, lateral, and cuspid on the same side of the midline); and 4) the second segment 200 captures the first bicuspid, second bicuspid, and first molar on the opposite side of the midline of the upper dentition 20 (the segment 200 does not capture the central, lateral, and cuspid on the same side of the midline).

FIGS. 6A-6D present various views of an orthodontic appliance 240 that is configured for installation on the lower dentition 2 of a patient and that is otherwise in accordance with the orthodontic appliance 70 of FIG. 2A and its corresponding discussion unless otherwise noted to the contrary herein. Primary components of the orthodontic appliance 240 include an arch expander 250, along with a first segment 190 and a second segment 200 in accordance with the foregoing. The arch expander 250 may be integrated with the first segment 190 and second segment 200 at least generally in accordance with FIG. 2D, FIG. 2E, or FIG. 2F. In this regard, the arch expander 250 includes an expansion module 180, a first leg 252a, and a second leg 252b. The first leg 252a of the arch expander 250 includes a first lingual section or segment 254a and a first end section or segment 256a that movably interfaces with the expansion module 180. Similarly, the second leg 252b of the arch expander 250 includes a second lingual section or segment 254b and a second end section or segment 256b that is fixed relative to the expansion module 180. The expansion module 180, the first leg 252a, and the second leg 252b may be disposed in at least generally coplanar relation when the orthodontic appliance 220 is in an installed configuration. The first leg 252a interfaces with the first segment 190 along at least a substantial portion of the length of the first segment 190 (the length dimension coinciding with proceeding along the lower dentition 2), while the second leg 252b interfaces with the second segment 200 along at least a substantial portion of the length of the second segment 200 (the length dimension coinciding with proceeding along the lower dentition 2).

Figure 6A:
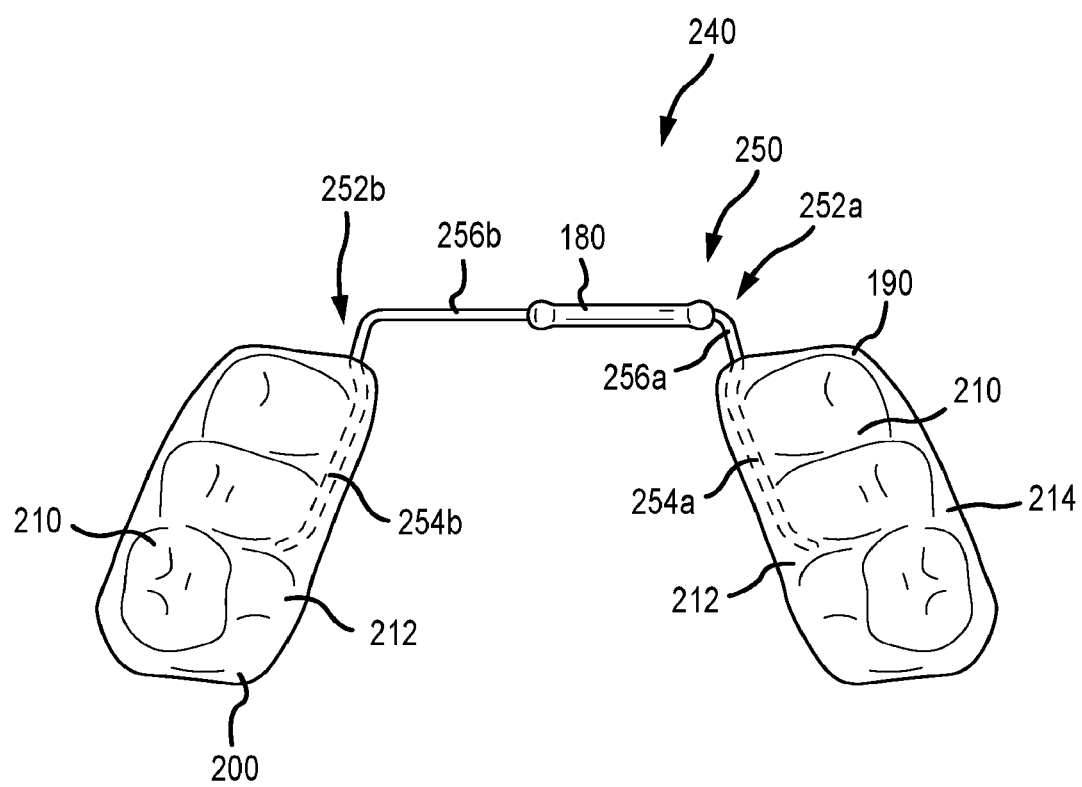
FIG. 6A is a perspective view of one embodiment of an orthodontic appliance that uses an arch expander that is anchored to a lingual wall of a pair of segments that are disposed on opposite sides of a patient's lower dentition and that each capture multiple teeth, and where the arch expander is in a fully expanded state.
Figure 6B:
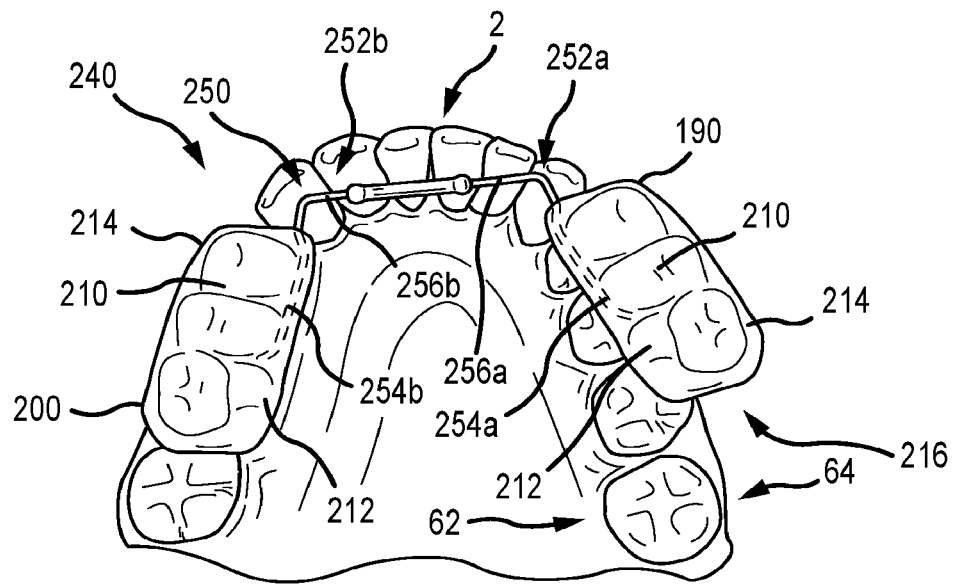
FIG. 6B is a perspective view of the orthodontic appliance of FIG. 6A being only partially installed on a lower dentition.
Figure 6C:
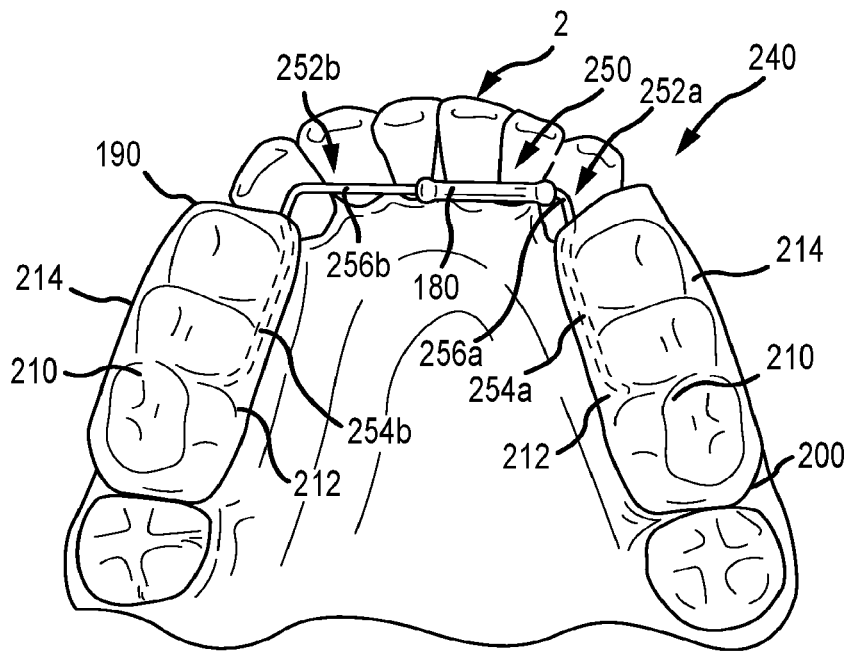
FIGS. 6C and 6D are perspective views of the orthodontic appliance of FIG. 6A being fully installed on a lower dentition.
Figure 6D:
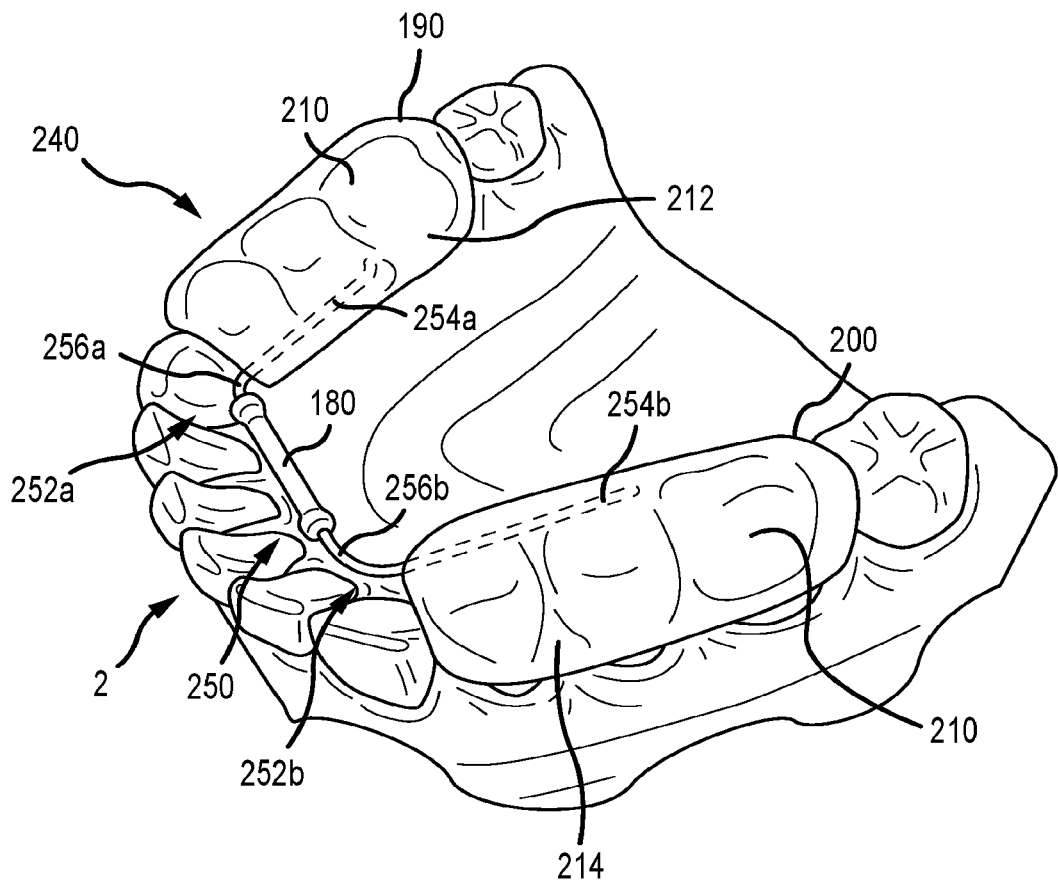
Figure 7A:
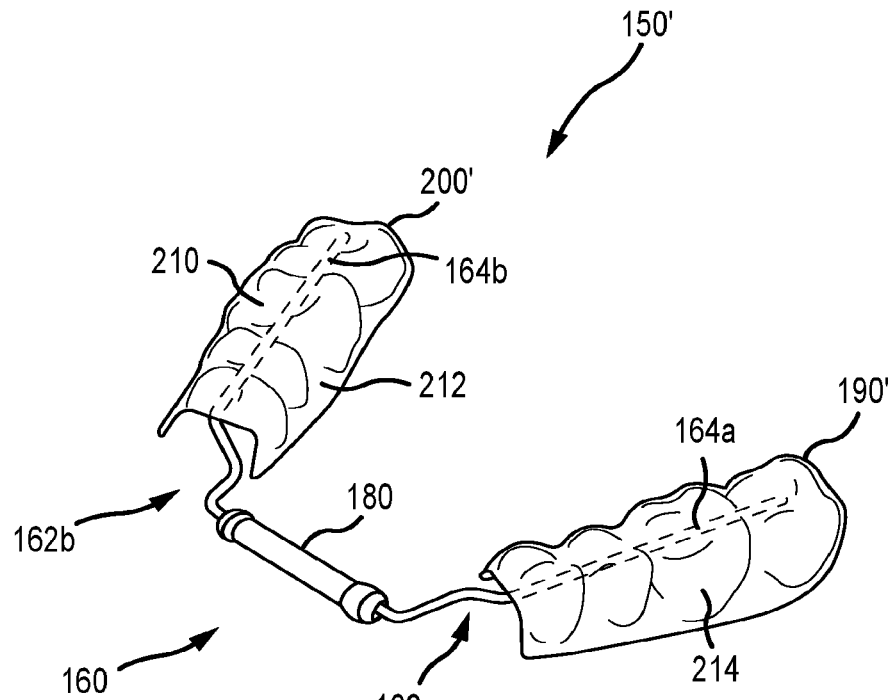
FIG. 7A is a perspective view of a variation of the orthodontic appliance of FIGS. 4A-4G, showing external surfaces of the two segments that each accommodate four teeth.
Figure 7B:
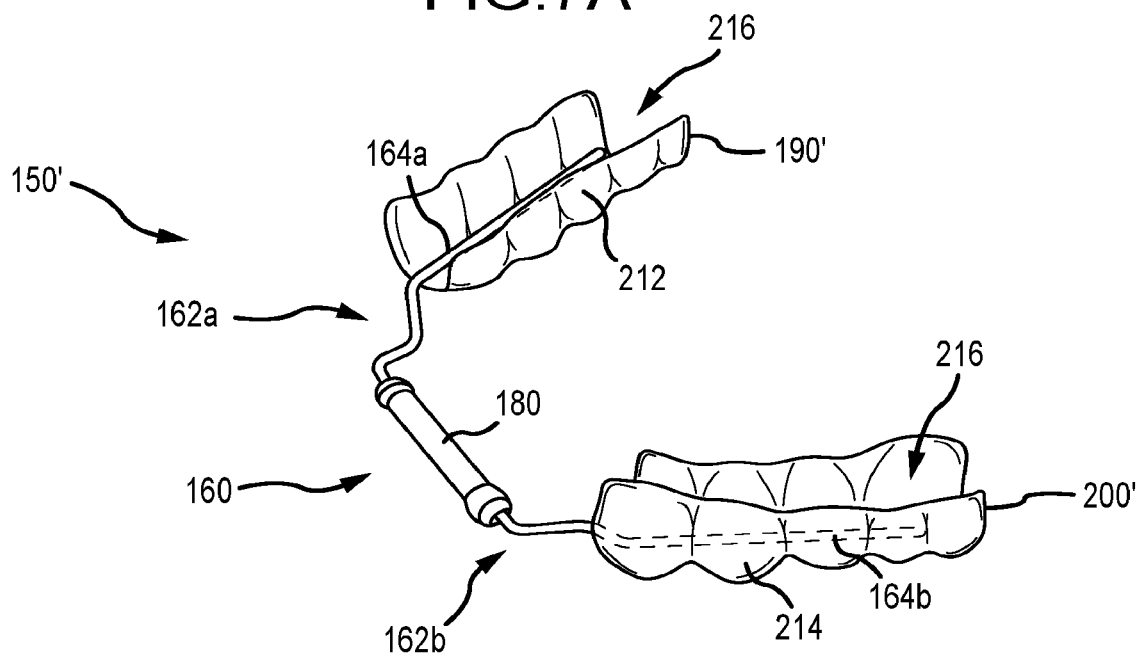
FIG. 7B is a perspective view of the orthodontic appliance of FIG. 7B, showing the tooth-receiving cavities of the two segments.

FIG. 6B illustrates the orthodontic appliance 240 being partially installed on the lower dentition 2. Specifically, the second segment 200 is installed on the first bicuspid, the second bicuspid, and the first molar on one side of the lower dentition 2. The arch expander 250 is in an expanded state such that the first segment 190 is not installed on the first bicuspid, the second bicuspid, and the first molar on the opposite side of the lower dentition 2. In order to complete the installation of the orthodontic appliance 240, the first segment 190 may be pushed toward the second segment 200 while installed on the lower dentition 2, and thereafter the first segment 190 may be pushed toward the lower dentition 2 such that the corresponding first bicuspid, second bicuspid, and first molar are received in the cavity 216 of the first segment 190 and as shown in FIGS. 6C and 6D. The orthodontic appliance 240 could be installed such that its first segment 190 and second segment 200 are simultaneously positioned on the corresponding portions of the lower dentition 2, for instance by compressing the arch expander 250 to align and then dispose the first segment 190 and second segment 200 on the corresponding portions of the lower dentition 2.

Consider the case where the first end section 256a of the first leg 252a for the arch expander 230 is circular or cylindrical. In addition to being axially movable relative to the expansion module 180, the first leg 252a (and thereby the first segment 190) may be rotated relative to the expansion module 180 about the interconnecting portion of the first end section 256a. Another embodiment has the first end section 256a of the first leg 252a for the arch expander 250 being square or rectangular (and the interfacing portion of the force mode 180 being complimentarily-shaped) such that relative motion between the first end section 256a and the expansion module 180 is at least substantially limited to relative axial motion.

In the case of the orthodontic appliance 220 being installed on a permanent lower dentition 2: 1) the expansion module 180 exerts collinear and oppositely-directed expansion forces ($F_1$ and $F_2$ in FIG. 1) on the lower dentition 2; 2) one of the expansion forces has a force vector that is typically oriented at least generally orthogonal to the midline of the lower dentition 2 and that intersects the lower dentition 2 on one side of this midline at a location associated with the corresponding cuspid, while the other of the expansion forces has a force vector that is also typically oriented at least generally orthogonal to the midline of the lower dentition 2 and that intersects the lower dentition 2 on the opposite side of this midline at a location associated with the corresponding cuspid; 3) the first segment 190 captures the first bicuspid, second bicuspid, and first molar on one side of the midline of the lower dentition 2 (the segment 190 does not capture the central, lateral, and cuspid on the same side of the midline); and 4) the second segment 200 captures the first bicuspid, second bicuspid, and first molar on the opposite side of the midline of the lower dentition 2 (the segment 200 does not capture the central, lateral, and cuspid on the same side of the midline).

FIGS. 7A-7F present views of a variation of the orthodontic appliance 150 of FIGS. 4A-4G. Corresponding components between these two embodiments are identified by the same reference numerals. Those corresponding components that differ in some respect are identified by a "single prime" designation in FIGS. 7A-7F. The orthodontic appliance 150' of FIGS. 7A-7F uses an arch expander 160, along with a first segment 190' and a second segment 200'. The cavity 216 for the first segment 190', as well as the cavity 216 for the second segment 200', each accommodate four adjacently-disposed teeth.

Figure 8A:
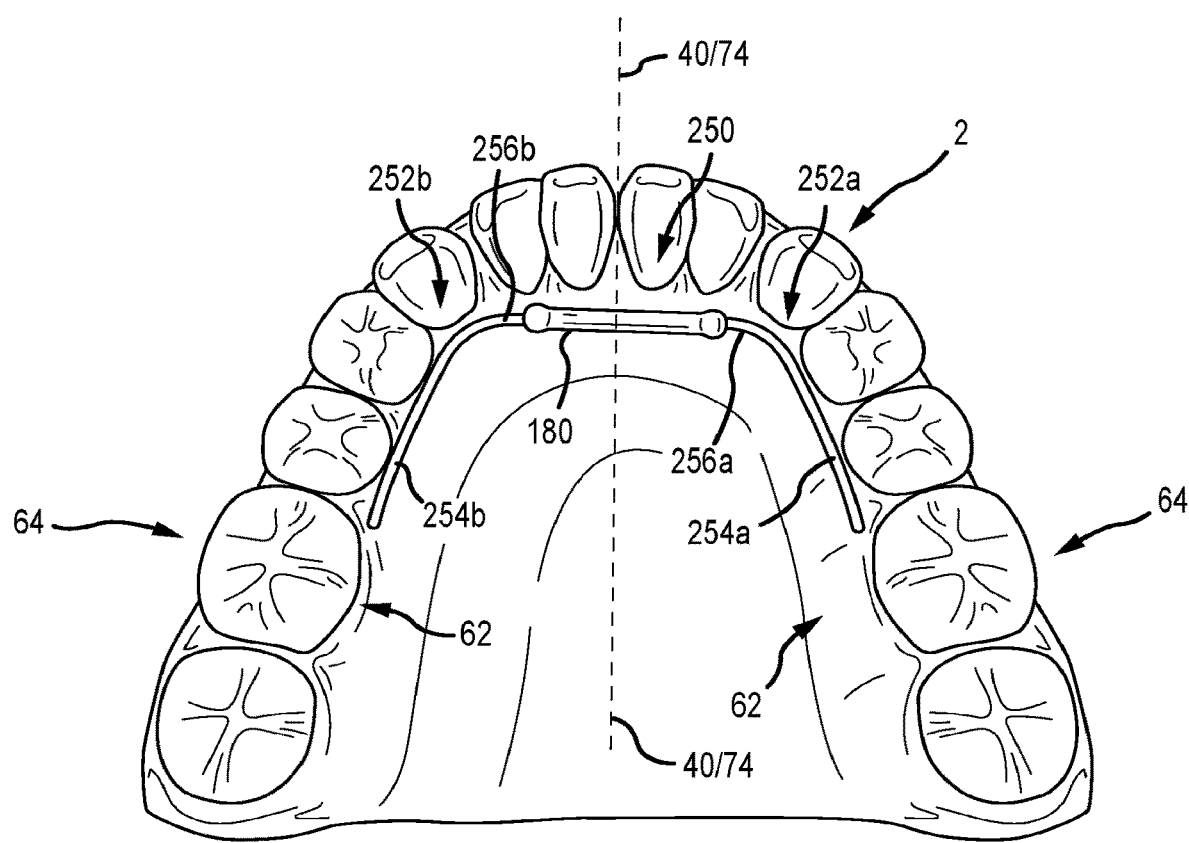
FIG. 8A is a perspective view of the arch expander used by the orthodontic appliance of FIGS. 6A-D, as the arch expander would be positioned relative to a lower dentition to provide an expansion function.

FIG. 8A illustrates the arch expander 250 used by the orthodontic appliance 220 of FIGS. 6A-6D and in a representative position relative to the lingual 62 of the lower dentition 2 to provide an expansion function of posterior/buccal teeth (e.g., first and second bicuspids, the first molar, and possibly the second molar). In this regard, the expansion module 180 is orientated such that the resulting force vectors exerted on left side of the lower dentition 2 (in the view shown in FIG. 8A, and via the anchoring provided by the second segment 200—not shown in FIG. 8A) and on right side of the lower dentition 2 (in the view shown in FIG. 8A, and via the anchoring provided by the first segment 190—not shown in FIG. 8A) are at least generally orthogonal to the midline 40 of the lower dentition 2 (which again coincides with the reference plane 74 noted above with regard to the orthodontic appliance 70 of FIG. 2A). These force vectors $F_1$ and $F_2$ are again shown in FIG. 1.

In the case of a permanent dentition, the segments 190, 200 would typically be mounted on the first bicuspid, second bicuspid, and first molar (and possibly the second molar) on the corresponding side of the dentition 2 and with the arch expander 250 being in the position illustrated in FIG. 8A. In the case of a mixed dentition, the segments 190, 200 would typically be mounted on the deciduous canine, the first deciduous molar, and second deciduous molar (and possibly the first molar) on the corresponding side of the dentition 2 and with the arch expander 250 being in the position illustrated in FIG. 8A. It should be appreciated that the arch expander 250, as shown in FIG. 8A, could be disposed in a similar position on/relative to the upper dentition 20, and with the segments 190, 200 being installed on the same teeth of the upper dentition 20 and including for the noted cases of a permanent dentition and a mixed dentition in relation to teeth commonly engaged by the segments 190, 200.

Figure 8B:
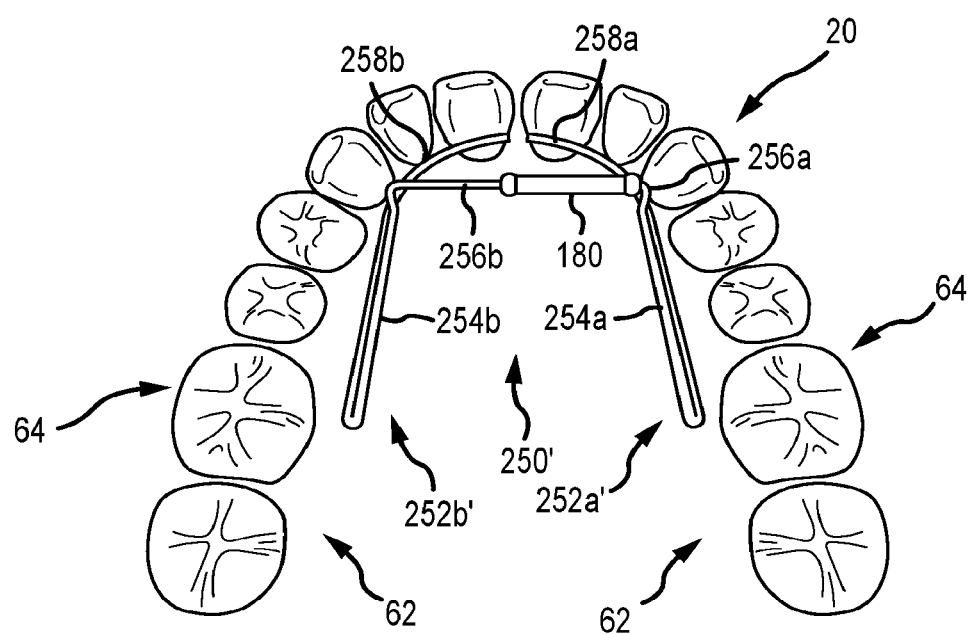
FIG. 8B is a plan view of one variation of the arch expander used by the orthodontic appliance of FIGS. 6A-D, namely to include a pair of anterior extensions for advancing incisors of an upper dentition.

FIG. 8B illustrates a variation of the arch expander 250 of FIG. 8A (again, without the segments 190, 200, and also in relation to the upper dentition 20). The arch expander 250' of FIG. 8B includes an anterior extension 258a for its first leg 252a' and an anterior extension 258b for its second leg 252b'. Each such anterior extension 258a, 258b may engage the lingual 62 of anterior/labial teeth of the upper dentition 20 to bias/move/advance the same in a mesial/anterior direction (toward the top of the page in the view shown in FIG. 8B). These anterior extensions 258a, 258b may be used by any of the arch expanders addressed herein.

Figure 8C:
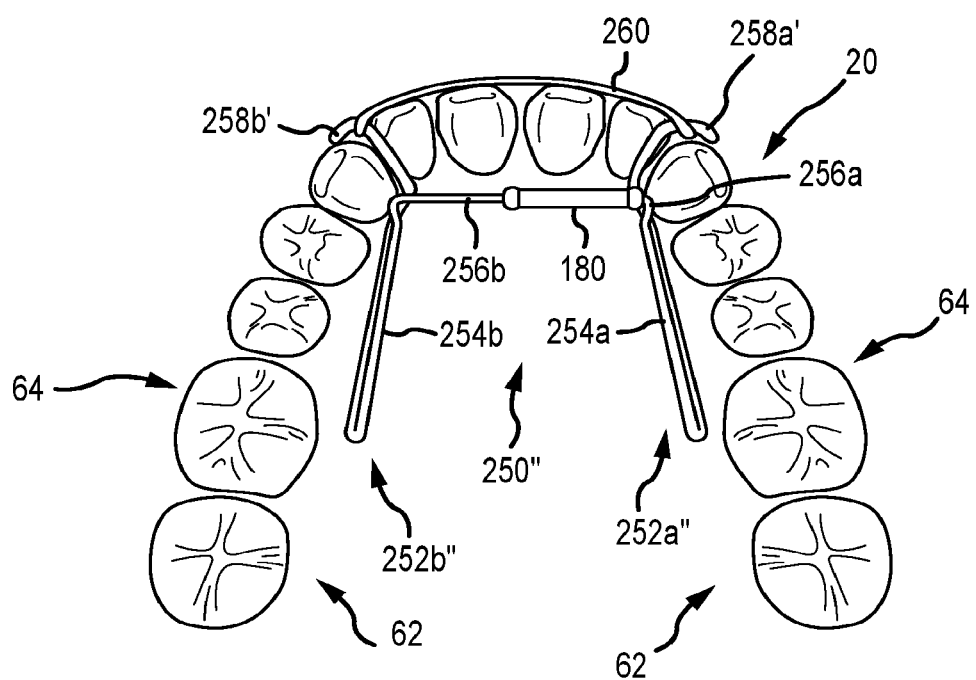
FIG. 8C is a plan view of another variation of the arch expander used by the orthodontic appliance of FIGS. 6A-D, namely to include a pair of anterior extension hooks for retracting incisors of an upper dentition.

FIG. 8C illustrates a further variation of the arch expander 250 of FIG. 8A (again, without the segments 190, 200, and also in relation to the upper dentition 20). The arch expander 250" of FIG. 8C includes an anterior extension 258a' for its first leg 252a" and an anterior extension 258b' for its second leg 252b". Each such anterior extension 258a', 258b' may disposed labially of anterior teeth of the upper dentition 20 so accommodate an elastic 260 to bias/move/advance the same in a distal/posterior direction (toward the bottom of the page in the view shown in FIG. 8C). These anterior extensions 258a', 258b' may be used by any of the arch expanders addressed herein.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method of orthodontic treatment using an orthodontic appliance, said orthodontic appliance comprising:
   a first segment;
   a second segment, wherein each of said first segment and said second segment comprises a buccal wall, a lingual wall spaced from its corresponding said buccal wall, and an occlusal wall extending between its corresponding said buccal and lingual walls, wherein said buccal wall, said occlusal wall, and said lingual wall of said first segment collectively define a first cavity, and wherein said buccal wall, said occlusal wall, and said lingual wall of said second segment collectively define a second cavity; and
   an expander comprising a first leg, a second leg, and an expansion module, wherein said first leg engages and is fixed relative to said first segment and comprises a first end section that movably interfaces with said expansion module, wherein said second leg engages and is fixed relative to said second segment and comprises a second end section that interfaces with said expansion module;
   wherein said method comprises the steps of:
   positioning said second segment on a dentition to simultaneously engage a first tooth, a second tooth, and a third tooth on a second side of a midline of said dentition, wherein said first tooth on said second side of said midline is anterior of each of said second tooth and said third tooth on said second side of said midline;
   moving said first segment along an axial path relative to and in a direction of said midline of said dentition;
   positioning said first segment on said dentition to simultaneously engage a first tooth, a second tooth, and a third tooth on a first side of said midline of said dentition that is opposite said second side, wherein said positioning said first segment step comprises rotating said first segment in a first direction relative to each of said second segment and said expansion module, wherein said first tooth on said first side of said midline is anterior of each of said second tooth and said third tooth on said first side of said midline, wherein said positioning said first segment is executed after said moving said first segment step, wherein there is an anterior gap between said first segment and said second segment proceeding along said dentition with said first and second segments being positioned on said dentition, and wherein said expansion module of said expander is disposed lingually of said dentition;

expanding said dentition using an expansion force provided by said expander and that is transmitted to said dentition by said first segment and said second segment, wherein said expanding comprises:

exerting a single expansion force on said first leg by said expansion module exerting a first axial force on said first leg, wherein a vector of said first axial force intersects said dentition at a location that coincides with said first tooth on said first side of said dentition or anteriorly of said first tooth on said first side of said dentition; and exerting a single expansion force on said second leg by said expansion module exerting a second axial force on said second leg, wherein a vector of said second axial force intersects said dentition at a location that coincides with said first tooth on said second side of said dentition or anteriorly of said first tooth on said second side of said dentition.

2. The method of claim 1, wherein said first and second axial forces are collinear with one another and are directed in opposite directions.

3. The method of claim 1, wherein a posterior-most location where said first axial force intersects said dentition on said first side of said midline coincides with a location of a corresponding first bicuspid for a permanent dentition or coincides with a location of a corresponding first deciduous molar for a mixed dentition, and wherein a posterior-most location where said second axial force intersects said dentition on said second side of said midline coincides with a location of a corresponding first bicuspid for a permanent dentition or coincides with a location of a corresponding first deciduous molar for a mixed dentition.

4. The method of claim 1, wherein said first axial force intersects said dentition on said first side of said midline within a region extending from a location that coincides with a corresponding first bicuspid to a location that coincides with a corresponding cuspid for a permanent dentition or from a location that coincides with a corresponding first deciduous molar to a location that coincides with a corresponding deciduous canine for a mixed dentition, and wherein said second axial force intersects said dentition on said second side of said midline within a region extending from a location that coincides with a corresponding first bicuspid to a location that coincides with a corresponding cuspid for a permanent dentition or from a location that coincides with a corresponding first deciduous molar to a location that coincides with a corresponding deciduous canine for a mixed dentition.

5. The method of claim 1, wherein said first axial force intersects said dentition on said first side of said midline at a location that coincides with a location of a corresponding cuspid for a permanent dentition or that coincides with a location of a corresponding deciduous canine for a mixed dentition, wherein said second axial force intersects said dentition on said second side of said midline at a location that coincides with a location of a corresponding cuspid for a permanent dentition or that coincides with a location of a corresponding deciduous canine for a mixed dentition.

6. The method of claim 1, wherein said dentition is a permanent dentition, wherein an anterior-most tooth that is engaged by said first segment is a first bicuspid on said first side of said midline, wherein an anterior-most tooth that is engaged by said second segment is a first bicuspid on said second side of said midline.

7. The method of claim 6, wherein said positioning a first segment step further comprises said first segment simultaneously engaging said first tooth, said second tooth, said third tooth, and a fourth tooth on said first side of a midline of a dentition, and wherein said positioning a second segment step further comprises said second segment simultaneously engaging said first tooth, said second tooth, said third tooth, and a fourth tooth on said second side of a midline of a dentition.

8. The method of claim 7, wherein said fourth tooth is a second molar on said first side of said midline of said dentition and a second molar on said second side of said midline of said dentition.

9. The method of claim 6, wherein said first segment fails to engage a central incisor, a lateral incisor, and a cuspid on said first side of said midline of said dentition, and wherein said second segment fails to engage a central incisor, a lateral incisor, and a cuspid on said second side of said midline of said dentition.

10. The method of claim 1, wherein said dentition is a permanent dentition, and wherein said first, second, and third teeth are a first bicuspid, a second bicuspid, and a first molar, respectively, on each of said first and second sides of said midline of said dentition.

11. The method of claim 1, wherein said dentition is a mixed dentition, wherein an anterior-most tooth that is engaged by said first segment is a deciduous canine on said first side of said midline, wherein an anterior-most tooth that is engaged by said second segment is a deciduous canine on said second side of said midline.

12. The method of claim 1, wherein said dentition is a mixed dentition, wherein said first, second, and third teeth are a deciduous canine, a first deciduous molar, and a second deciduous molar on each of said first and second sides of said midline of said dentition.

13. The method of claim 12, wherein said positioning a first segment step further comprises said first segment simultaneously engaging said first tooth, said second tooth, said third tooth, and a fourth tooth on said first side of a midline of a dentition, and wherein said positioning a second segment step further comprises said second segment simultaneously engaging said first tooth, said second tooth, said third tooth, and a fourth tooth on said second side of a midline of a dentition.

14. The method of claim 13, wherein said fourth tooth is a first permanent molar on said first side of said midline of said dentition and a first permanent molar on said second side of said midline of said dentition.

15. The method of claim 12, wherein said first segment fails to engage a central incisor and a lateral incisor on said first side of said midline of said dentition, and wherein said second segment fails to engage a central incisor and a lateral incisor on said second side of said midline of said dentition.

16. The method of claim 1, wherein a plurality of teeth are exposed proceeding from said first segment to said midline of said dentition proceeding along said dentition on said first side of said dentition, and wherein a plurality of teeth are exposed proceeding from said second segment to said midline of said dentition proceeding along said dentition on said second side of said dentition.

* * * * *